(12) United States Patent
Flores Sandoval et al.

(10) Patent No.: US 12,312,543 B2
(45) Date of Patent: May 27, 2025

(54) HIGHLY RANDOM ADDITION BYPOLYMERS FOR DESTABILIZATION OF COMPLEX EMULSIONS IN CRUDE OIL BLENDS

(71) Applicant: Instituto Mexicano del Petróleo, Mexico City (MX)

(72) Inventors: Cesar Andres Flores Sandoval, Mexico City (MX); Flavio Salvador Vazquez Moreno, Mexico City (MX); Fernando Alvarez Ramirez, Mexico City (MX); Gerardo Zavala Olivares, Mexico City (MX); Erika Gomez Buendia, Mexico City (MX); Enrique Cevada Maya, Mexico City (MX); Jessica Valeria Fuentes Santiago, Mexico City (MX); Edgar Benedicto Zamora Guerrero, Mexico City (MX); Citlally Janinne Vargas Martinez, Mexico City (MX)

(73) Assignee: Instituto Mexicano del Petróleo, Mexico City (MX)

( * ) Notice: Subject to any disclaimer, the term of this patent is extended or adjusted under 35 U.S.C. 154(b) by 0 days.

(21) Appl. No.: 18/581,136

(22) Filed: Feb. 19, 2024

(65) Prior Publication Data

US 2024/0327725 A1 Oct. 3, 2024

Related U.S. Application Data

(62) Division of application No. 18/198,588, filed on May 17, 2023, now Pat. No. 11,920,092, which is a division of application No. 17/099,635, filed on Nov. 16, 2020, now Pat. No. 11,692,144.

(30) Foreign Application Priority Data

Oct. 29, 2020 (MX) .................. MX/A/2020/011505

(51) Int. Cl.
  *C10G 33/04* (2006.01)
  *C08F 2/22* (2006.01)
  *C08F 2/30* (2006.01)
  *C08F 216/38* (2006.01)
  *C08F 220/18* (2006.01)
  *C08L 33/08* (2006.01)

(52) U.S. Cl.
  CPC .............. *C10G 33/04* (2013.01); *C08F 2/22* (2013.01); *C08F 2/30* (2013.01); *C08F 216/38* (2013.01); *C08F 220/1804* (2020.02); *C08L 33/08* (2013.01); *C10G 2300/206* (2013.01); *C10G 2300/308* (2013.01)

(58) Field of Classification Search
  CPC .............. C10G 33/04; C10G 2300/206; C10G 2300/308; C08F 220/1804; C08F 2/22; C08F 2/30; C08F 216/38; C08L 33/08

USPC .......................................................... 524/365
  See application file for complete search history.

(56) References Cited

U.S. PATENT DOCUMENTS

| 5,693,216 A | * | 12/1997 | Hart | ..................... B01D 17/047 |
| | | | | 210/708 |
| 6,294,093 B1 | | 9/2001 | Selvarajan | |
| 10,125,226 B2 | | 11/2018 | Flores Sandoval | |
| 2018/0162975 A1 | * | 6/2018 | Hernández Carbajal | ..................... |
| | | | | B01D 17/047 |

FOREIGN PATENT DOCUMENTS

| EP | 614919 A1 | 9/1994 |
| WO | 9208835 A1 | 5/1992 |

OTHER PUBLICATIONS

Alvarez, F., et al., "Dissipative Particle Dynamics (DPD) Study of Crude Oil-Water Emulsions in the Presence of a Functionalized Co-polymer", Energy & Fuels 25 (2011) 562-567.

Cendejas, Gabriel, et al. "Demulsifying super-heavy crude oil with bifunctionalized block copolymers." Fuel 103 (2013): 356-363.

Cendejas et al., ""Theoretical and experimental studies of the initiator influence onthe anionic ring opening 3olymerization of propylene oxide"", Journal of Molecular Structure, 2008, pp. 40-52, vol. 879, Available online at An.sciencedirect.com, www.elsevier.com/locate/molstruc.

Cevada, E., et al., "Novel petroleum demulsifiers based on acrylic random copolymers", Journal of Dispersion Science and Technology, DOI: 10.1080/01932691.2018.1472009, 2018, https://doi.org/10.1080/01932691.2018.1472009, 13 pages.

Flores-Sandoval et al., "Experimental and theoretical study of bifunctionalized PEO-PPO-PEO triblock copolymers with applications as dehydrating agents for heavy crude oil", Arabian Journal of Chemistry, Jan. 28, 2014, pp. 1-10, http://dx.doi.org/10.1016/j.arabjc.2014.01.021.

Gutierrez, "Theoretical-Experimental Study of Crude Dehydration Potential Heavy Polymer-Induced Addition", Jul. 2014, pp. 120-123, Machine Translation.

(Continued)

*Primary Examiner* — Kelechi C Egwim
(74) *Attorney, Agent, or Firm* — FisherBroyles, LLP; Jason P. Mueller

(57) ABSTRACT

The present invention is related to the use of ethylene alkanoate-alkyl acrylate bipolymers with a high randomness monomers distribution, which are synthesized by semicontinuous emulsion polymerization process, characterized because it is carried out using slow addition rate of the pre-emulsion feeding ($\dot{q} \leq 0.009$ kg·L$^{-1}$·min$^{-1}$), stabilized this last one by alkyl glycol ether type surfactants, at temperatures higher than 75° C. and with solids contents above 25 wt %, which avoids the formation of large sequences (blocks) of a same monomer. This structural characteristic gives the ethylene alkanoate-alkyl acrylate bipolymers a high efficiency as chemical agents for removal of complex water/crude oil emulsions of crude oil blends.

1 Claim, 17 Drawing Sheets

(56) References Cited

OTHER PUBLICATIONS

Hernandez et al., "Synthesis, characterization and evaluation as petroleum demulsifiers of multi-branched block copolymers", Energy & Fuels, Jun. 3, 2016, pp. 1-54, DOI: 10.1021/acs.energyfuels. 6b00419, Downloaded from http://pubs.acs.org on Jun. 3, 2016, ACS Publications.

Jinhuan et al., "The Synthesis and Investigation of the Ternary Copolymerization Demulsifier", May 6, 2020: http://en.cnki.com. cn/Articleen/CJFDTotal-STOG200503020.htm.

McClements et al., "Structured emulsion-based delivery systems: Controlling the digestion and release of lipophilic food components", Advances in Colloid and Interface Science, Jul. 3, 2010, pp. 213-228, Journal Homepage: www.elsevier.com/locate/cis.

Moreno, "New Process of Dehydrating Oil Using Random Acrylic Copolymers", Oct. 2016, pp. 50-54, Machine Translation.

Palacios, "Synthesis of Base Acrylic Copolymers of Alkyl Via Polymerization in Emulsion as Deemulsifying Agents in Crude Oils Heavy Mexicans", Dec. 2015, pp. 1-6, Machine Translation.

Pradilla et al., "Demulsifier Performance and Dehydration Mechanisms in Colombian Heavy Crude Oil Emulsions", Energy & Fuels, 2017, pp. 10369-10377, vol. 31, DOI: 10.1021/acs.energyfuels. 7b01021, ACS Publications.

Zamora et al., "Triblock copolymers functionalized with quaternary ammonium salts as dehydrating agents for heavy and extra-heavy crude oils", Journal of Dispersion Science and Technology, Jan. 16, 2018, 9 pages, https://doi.org/10.1080/01932691.2017.1421078.

\* cited by examiner

HIGHLY RANDOM ADDITION BYPOLYMERS FOR DESTABILIZATION OF COMPLEX EMULSIONS IN CRUDE OIL BLENDS

RELATED APPLICATIONS

This application is a divisional of U.S. patent application Ser. No. 18/198,588, filed May 17, 2023, which is a divisional of U.S. patent application Ser. No. 17/099,635, filed Nov. 16, 2020, now U.S. Pat. No. 11,692,144, issued Jul. 4, 2023, which claims priority under 35 U.S.C. § 119 to Mexican Patent Application No. MX/a/2020/011505, filed Oct. 29, 2020, the disclosure of which is incorporated herein by reference.

FIELD OF INVENTION

The present invention belongs to the field of chemical products for petroleum or crude oil conditioning, particularly, to demulsifying and dehydrating chemical compounds.

This invention is related to the application of bipolymers based on ethylene-alkanoate-alkyl acrylate combinations, with a highly random monomer distribution in the chain, for destabilizing complex water/crude oil emulsions and salts dissolved therein. These emulsions are formed in mixtures of different crude oils, with densities from 4 to 35° API, and found in triphasic separation units.

BACKGROUND OF THE INVENTION

As time goes on, heavy crude oils are more frequently extracted with a higher asphaltene contents. Because of their high viscosity and to satisfy the production quotas, these crude oils are blended with other crude oils, preferably lighter. Additionally, during the production and transport of crude oils, operational needs oblige the handling of streams made up of crude oil blends of different composition. The need to integrate these blends is provoking serious problems, because of many crude oils are incompatible with each other, leading to segregations at macro or microscopic level. It is noteworthy to mention that a large part of the crude oils produced in mature fields, both light and heavy, are extracted by means of acid stimulation of well. The acidity of the fluid further contributes to stabilizing the complex emulsions formed in crude oil blends.

The incompatibilities of crude oil blends can be observed as asphaltene agglomerates or by the formation of paraffin crystals. The effect of asphaltene and paraffin aggregates result in an increase of viscosity and, especially, in the formation of complex water/crude oil emulsions. It has been observed that asphaltenes, with polyaromatic structures provided with polar groups, have a marked surfactant activity and strongly stabilize the water droplets dispersed in crude oil. Indeed, asphaltenes are placed around the water droplets, hindering their coalescence with other drops [1]. Whereas, in common primary-type emulsions, this asphaltene layer is relatively thin (spherical drops of water dispersed in crude oil), in complex emulsions, that are formed in incompatible crude oil blends, it is observed that water droplets are enclosed by thick layers of asphalt agglomerates or, even, are occluded within extensive asphalt areas (see the micrographs of crude oil samples: blank, COP-04 and FC-01 in FIGS. 10, 12, 14, 16 and 18). Not only the coalescence of water droplets is strongly hindered, but the diffusion of chemical demulsifiers becomes very difficult, as they must cross this extensive barrier to reach the water/crude oil interface and destabilize it. In addition to this hindering, the formation of paraffin agglomerates is found (see the micrograph of the crude oil sample treated with BV-642 in FIG. 14), which tend to precipitate on the water/crude oil interface, to prevent the coalescence between the droplets of the aqueous phase and to halt the diffusion of any chemical product.

The emulsions formed in blends of incompatible crude oils, show a great morphological complexity, being able to appear as secondary emulsions crude oil/water/crude oil [2], tertiary (water/crude oil/water/crude oil) or to possess completely irregular drop shapes. Another characteristic is the high polydispersity of the emulsified water droplet sizes ranging from nanometers to several microns; the primary emulsions, that are formed in conventional crude oils (without blend), display a lower polydispersity of the droplet diameter.

Another important aspect to consider is that, conventionally, the water from primary water/crude oil emulsions has been removed by adding demulsifiers as polyethers, alkydalic or phenolic resins, polyamines, etc. [3].

Most of the commercial demulsifiers correspond to block bipolymers derived from the propylene oxide (PO) and ethylene oxide (EO). These bipolymers show a structure consisting of a hydrophobic central block, formed by a sequence of PO monomers [4], and provided with two terminal hydrophilic sequences of EO monomer. Block bipolymers of PO/EO can possess two arms (Pluronic®) as commercial name), three arms, four arms (Tetronic®) as commercial name) or a greater number of arms [5]. These polymeric compounds hold hydroxyl ending groups, which contribute to destabilize the water/crude oil interface; however, holding the disadvantage that in acid media cause the chemical degradation of the polymeric chain and a loss of dehydrating performance. Similarly, alkydalic and phenolic resins [6] possess numerous-OH ending groups, which undergo chemical attack in acidic media.

An alternative to increase the dehydrating performance of polyethers [7] and make them invulnerable to acid attacks after performing the stimulation operations during the well production is to replace the ending hydroxyl groups with other functional groups [8], as amino type [9] or ester. With that, it has been observed that this new generation of dehydrating agents have a better performance than polyethers or traditional resins, and that they are even capable of removing water from heavy or extra-heavy crude oils [1], [10]. However, a structural limitation in the performance of polyethers and resins is that, these are made up of hydrophobic and hydrophilic blocks, which, even if this allows them to dissolve in crude oil and interact with the water/crude oil interface, prevents them to a fast diffusion in the successive secondary emulsions, first of crude oil, later of water and finally, to interact with two different water/crude oil interfaces. In the case of tertiary emulsions, the problem is even more deficient, because the polymer must penetrate four phases and destabilize three interfaces. On irregular-shaped emulsions the diffusion problem and destabilization of dispersed phase become even more complex.

Recently, some researchers have shown that bipolymers [11], or terpolymers [13], with random sequences of monomers of different polarities and that form polymers with low glass transition temperature, are able to diffuse efficiently through crude oil, depending on their molecular mass. Once these pass through the organic phase, random bipolymers are located around the water droplets, displacing the asphaltenes, reducing the interfacial tension, and thus, destabilizing the water-in-crude oil emulsion.

Considering the high costs and problems in the availability of propylene and ethylene oxides, the application of bipolymers based on addition monomers as dehydrating agents has great advantages. One of them is that, since these do not have ending hydroxyl groups, their chemical stability is not affected during the periods of well acid stimulation. Also, their high clarifying capacity of the water removed from crude oil has been reported, which facilitates their disposition. Some of these bipolymers have a lower performance than the commercial formulations of polyethers and resins; this factor is compensated by their low cost and their resistance to the chemical degradation in acidic media. Examples of this type of bipolymer, among others reported in the literature, are the following: Hernández, E. I. et al. [11], Flores, C. A. et al. [12], González, N. [13], Martínez, A. A. y Ramírez, D. [15].

Following, it is described the known references by the applicant, in which are described the use of acrylic polymers as dehydrated agents in crude oil:

U.S. Pat. No. 5,100,582, Bhattacharyya, B. R., (1992) "Water soluble polymer as water-in-oil demulsifier" describes water-soluble acrylic tetrapolymers with low performance in the presence of large amounts of asphaltenes.

U.S. Pat. No. 6,702,946 Rosati, L., Kozakiewicz, J. J. (2004), entitled "Aqueous dispersions" [17], refers to acrylic bipolymers synthesized by emulsion polymerization with clarifying properties of the aqueous phase. The influence of molecular mass on the performance as clarifier is not reported in the document.

The abstract of the article entitled "The Synthesis and Investigation of the Ternary Copolymerization Demulsifier. Chemical Engineering of Oil and Gas 3", Jinhuan, Li., Kang, W., Sun, Ch. (2005), available in http://en.cnki.com.cn/Article_en/CJFDTotal-STQG200503020.htm [18], describes styrene-acrylic terpolymers synthesized by solution polymerization in a batch reactor.

U.S. Pat. No. 7,470,744, entitled "Copolymers useful as demulsifiers and clarifiers", Behles, J. (2008) [19], describes styrene-acrylic-methacrylic terpolymers synthesized by emulsion polymerization, with a good performance as clarifiers but with limited capabilities as breakers and coalescer of the emulsion.

Chinese Pat. No. CN 101255354 B1, entitled "Non-polyether type heavy oil demulsifier and its preparation method", Xu Wei, Sheng L. Z., Tian Y. F., Chen Y. P. (May 2011) [20], is related to butyl acrylate bipolymers and acrylic acid synthesized by semi-batch solution polymerization with heterogeneous composition and structure.

The master's thesis entitled "Theoretical experimental study of the dehydration potential of heavy crude oil induced by addition polymers" Ramírez, D., Mexican Institute of Petroleum, Mexico city (2014) [15], describes ethylene-acrylic alkylate bipolymers, with random structure with long acrylic sequences, with performance as dehydrating agents based on their composition and molecular mass, similar to that of polyether formulations. These bipolymers are difficult to scale up at industrial level.

The bachelor's thesis designated "Synthesis of alkyl acrylate-based copolymers via emulsion polymerization as demulsifying agents in Mexican heavy crude oils" by Gonzalez N., Higher Education School of Chemical Engineering and Extractive Industries, Mexico City, p. 66, 103-106 (2015) [13], is related to acrylic bipolymers, prepared by emulsion polymerization. Their performance as dehydrating agents depend on the composition and molecular mass. These acrylic bipolymers removed significant amounts of emulsified water at high doses (>1500 ppm).

The bachelor's thesis entitle "New crude oil dewatering process using random acrylic copolymers", Martínez, A. A., Higher Education School of Chemical Engineering and Extractive Industries, Mexico city, p. 82-84 (2017), [14], refers to random acrylic bipolymers, prepared by emulsion polymerization. These bipolymers are water soluble, which makes difficult to be dispersed in crude oil.

U.S. patent application Ser. No. 15/348,434, entitled "Copolymers useful as water clarifiers and for water-oil separation", Jakubowski, W. (2017) [21], mentions acrylic bipolymers synthesized by emulsion polymerization with capacity only as clarifier of the aqueous phase and that require to be formulated together with others chemical compounds as a breaker and a coalescer of emulsions.

U.S. patent application Ser. No. 15/726,793, with title "Demulsifiers for crude oil based on acrylic-aminoacrylic random copolymers of controlled molecular mass", Hernández, E. I., Flores, C. A., Álvarez, F., López, A., García, R. D. J., Zavala, G., Vázquez, F. (2018) [11], refers to random acrylic-aminoacrylic bipolymers with high performance, depending on composition and molecular mass, to dehydrate and desalt petroleum.

These bipolymers are synthesized by semi-continuous emulsion polymerization and each basic has properties such as breaker, coalescer and clarifier.

U.S. patent Ser. No. 10/793,783, entitled "Water/crude oil removers based on alkylacrylic-carboxyalkylacrylic random copolymers of controlled molecular mass", Flores, C. A., Chávez, M. A., Zamora, E. B., López, A., Zavala, G., Álvarez, F., Vázquez, F. (2020) [12], mentions random acrylic-carboxyacrylic bipolymers with high performance, depending on the composition and molecular mass, to dehydrate and desalt of crude oil. These bipolymers are synthesized by semi-continuous emulsion polymerization and each basic has properties such as breaker, coalescer and clarifier.

The article entitled "Novel petroleum demulsifiers based on acrylic random copolymers", Cevada, E., Palacios, N., Hernández, E., Castro, L., López, A., Flores, C., Vázquez, F., Journal of Dispersion Science and Technology 40.4, 495-506 (2019) [22], refers to random acrylic bipolymers with high performance, depending on the composition and molecular mass. These acrylic bipolymers are prepared by semi-continuous emulsion polymerization and remove significant amount of water at high doses (>1500 ppm).

Mexican Pat. Appl. MX/a/2020/002212, entitled "Demulsifiers for crude oil based on acrylic-aminoacrylic-carboxyacrylic terpolymers", Zamora, E. B., Fuentes, J. V., Vargas, C., Flores, C. A., Álvarez, F., Zavala, G., Vázquez, F. (2020), [23], describes random acrylic-aminoacrylic-carboxyacrylic terpolymers, with high performance, depending on the composition and molecular mass, to dehydrate and desalt crude oil. These bipolymers are synthesized by semi-continuous emulsion polymerization and each basic has properties such as breaker, coalescer and clarifier.

On the other hand, in order to note the wide use of random polymers in the petroleum industry and highlight the novelty of the present invention, the Canadian Pat. No. CA 2,714,797 C (2020), entitled "Formulations of random polymers for improving crude petroleum flow", Castro, L. and et al. [24], protects the use of formulations of random copolymers or terpolymers based on acrylic, synthesized by semi-continuous emulsion polymerization as flow improvers. It is important to mention that the authors describe the use of styrene and/or vinyl acetate as part of the formulation. Mexican Pats. MX331169 [25], MX338859 [26], MX338860 and MX38861 refer to the same line of research.

The research work by Ramirez, D. [29], in which is reported the synthesis of butyl acrylate and ethylene ethanoate bipolymers by semi-continuous emulsion polymerization, were used to emulsifier the monomers a mixture of sodium salts of alkyl aryl polyglycol sulfate, which, evidently, limited the latex stabilization to a maximum solids content of 20 wt. % and at a temperature of 70° C. Obtained bipolymers were evaluated in a primary water/crude oil emulsion, detected in a heavy Mexican crude oil, showing dehydrating activity at dosages of at least 500 ppm [30].

This ability to remove or destabilize the primary emulsion was similar to that of commercial polyether formulations. It should be noted that the molecular weight of most of the reported bipolymers is within the range of 2000 to 2900 g/mol, with polydispersity indexes between 3.44 to 4.05 [31].

It is deduced from the spectroscopic data reported in the same document, that the chains of the ethylene alkylate-acrylic bipolymers have sequences of the monomers of considerable length, which limited their destabilizing capacity in the water/crude oil interface (see FIG. 1a). Indeed, a low intensity signal in the NMR spectrum of ethylene alkylate-acrylic bipolymers, obtained by the procedure reported in this master's thesis work by Ramírez, D. [32], was observed at chemical shift of 69.8 ppm corresponding to C9 carbon atom (see FIG. 3). This signal is narrow, which is related to a large proportion of long sequences of vinyl I units (blocks); in a bipolymer of greater randomness and alternation of the vinyl units, the width of the signal should be greater.

As mentioned above, the obtained bipolymers by the procedure described in the literature present long monomeric sequences (blocks) and are schematized in FIG. 1a.

Thus, the ethylene alkylate-acrylic bipolymers, although showing good performance as dehydrating agents for primary water-in-crude oil emulsions, display the following drawbacks:

1) These are synthesized as latex with a solids content of only 20 wt %.
2) These are obtained as bipolymers with long vinyl and acrylic sequences (FIG. 1a).

These characteristics limit the efficiency to destabilize complex emulsions in crude oil blends and the scale up to industrial level. Additional known references are:

[1] Álvarez, F., Flores, E. A., Castro, L. V., Hernández, J. G., López, A., Vázquez, F. (2011). Dissipative particle dynamics (DPD) study of crude oil-water emulsions in the presence of a functionalized co-polymer. *Energy & Fuels*, 25 (2), 562-567.

[2] McClements, D. J., Y., Li. (2010). Structured emulsion-based delivery systems: controlling the digestion and release of lipophilic food components. Advances in Colloid and interfase science, 159 (2), 213-228.

[3] Pradilla, D., Ramírez, J., Zanetti, F., Álvarez, O. (2017). Demulsifier performance and dehydration mechanisms in Colombian heavy crude oil emulsions. *Energy & Fuels*, 31 (10), 10369-10377.

[4] Cendejas, G., Flores, C. A., Huitrón, N., Herrera, R., Zamudio, L. S., Beltrán, H. I., Vázquez, F. (2008). Theoretical and experimental studies of the initiator influence on the anionic ring opening polymerization of propylene oxide. *Journal of Molecular Structure*, 879 (1-3), 40-52.

[5] Hernández, E. I., Castro, L. V., Avendaño, J. R., Flores, C. A., Álvarez, F., Vázquez, F. (2016). Synthesis, characterization, and evaluation of petroleum demulsifiers of multibranched block copolymers. *Energy & Fuels*, 30 (7), 5363-5378.

[6] Radhakrishnan, S., Sivakumar, A., Marble, R. A. (2001). Aqueous dispersion of an oil soluble demulsifier for breaking crude oil emulsions. U.S. Pat. No. 6,294,093.

[7] Flores, C. A., Flores, E. A., López, A., Hernández, J. G., Estrada, A., Castro, L. V., Vázquez, F. (2018). Scale-up process of bifunctionalized triblock copolymers with secondary and tertiary amines, with application in dewatering and desalting of heavy crude oils. U.S. Pat. No. 10,125,226.

[8] Cendejas, G., Arreguín, F., Castro, L. V., Flores, E. A., Vázquez, F. (2013). Demulsifying super-heavy crude oil with bifunctionalized block copolymers. *Fuel*, 103, 356-363.

[9] Flores, C. A., Castro, L. V., Flores, E. A., Álvarez, F., García-Murillo, A., López, A., Vázquez, F. S. (2017). Experimental and theoretical study of bifunctionalized PEO-PPO-PEO triblock copolymers with applications as dehydrating agents for heavy crude oil. *Arabian Journal of Chemistry*, 10 (3), 410-419.

[10] Zamora, E. B., Vázquez, F., Hernández, E. I., Álvarez, F., Zavala, G., López, A., Flores, C. A. (2018). Triblock copolymers functionalized with quaternary ammonium salts as dehydrating agents for heavy and extra-heavy crude oils. *Journal of Dispersion Science and Technology*, 39 (10), 1502-1509.

[11] Hernández, E. I., Flores, C. A., Álvarez, F., López, A., García, R. D. J., Zavala, G., Vázquez, F. (2018). Demulsifiers for crude oil based on acrylic-aminoacrylic random copolymers of controlled molecular mass. U.S. patent application Ser. No. 15/726,793

[12] Flores, C. A., Chávez, M. A., Zamora, E. B., López, A., Zavala, G., Álvarez, F., Vázquez, F. (2020). Water/crude oil removers based on alkylacrylic-carboxyalkylacrylic random copolymers of controlled molecular mass. U.S. Pat. No. 10,793,783.

[13] González, N. (2015). Síntesis de copolímeros base acrilatos de alquilo vía polimerización en emulsión como agentes desemulsificantes en aceites crudos, (tesis de licenciatura). Escuela Superior de Ingeniería Química e Industrias Extractivas, Ciudad de México, p. 66, 103-106.

[14] Martínez, A. A. (2016). Nuevo proceso de deshidratado de petróleo empleando copolímeros acrílicos aleatorios, (tesis de licenciatura). Escuela Superior de Ingeniería Química e Industrias Extractivas, Ciudad de México, p. 50-55.

[15] Ramírez, D. (2014). Estudio theórico experimental del potencial de deshidratado de crudos pesados inducido por polímeros de adición (tesis de maestría en ingeniería). Instituto Mexicano del Petróleo, Ciudad de México, p. 120-123.

[16] Bhattacharyya, B. R. (1992). Water soluble polymer as water-in-oil demulsifier. U.S. Pat. No. 5,100,582.

[17] Huang, S. Y., Rosati, L., Kozakiewicz, J. J. (2004). Aqueous dispersions. U.S. Pat. No. 6,702,946.

[18] Jinhuan, Li., Kang, W., Sun, Ch. (2005). The Synthesis and Investigation of the Ternary Copolymerization Demulsifier. Chemical Engineering of Oil and Gas 3, abstract in http://en.cnki.com.cn/Article_en/CJFDTotal-STQG200503020.htm.

[19] Behles, J. (2008). Copolymers useful as demulsifiers and clarifiers. U.S. Pat. No. 7,470,744, http://en.cnki.com.cn/Article_en/CJFDTotal-STQG200503020.htm.

[20] Xu Wei, Sheng L. Z., Tian Y. F., Chen Y. P. (2011). Non-polyether type heavy oil demulsifier and its preparation method, China Pat.t CN 101255354 B1.

[21] Jakubowski, W. (2017) Copolymers useful as water clarifiers and for water-oil separation. U.S. patent application Ser. No. 15/348,434

[22] Cevada, E., Palacios, N., Hernández, E., Castro, L., López, A., Flores, C., Vázquez, F. (2019). Novel petroleum demulsifiers based on acrylic random copolymers. Journal of Dispersion Science and Technology, 40 (4): 495-506

[23]. Zamora, E. B., Fuentes, J. V., Vargas, C., Flores, C. A., Álvarez, F., Zavala, G. y Vázquez, F., (2020), Desemulsionantes para aceite crudo con base en terpolímeros acrílico-aminoacrílico-carboxiacrílico, Mexican Pat. Appl. Mx/a/2020/002212.

[24] Castro, L., Flores, E., Cendejas, G., Lozada, M., Vázquez, F. (2020). Formulations of random polymers for improving crude petroleum flow, Canadian Pat. CA 2,714, 797 C.

[25] Flores, E., Lozada, M., Cendejas, G., Castro, L., Vázquez, F. (2015) Formulación de polímeros aleatorios para mejorar flujo de crudos del petróleo. Mexican Pat. MX 331169 B.

[26] Lozada, M., Flores, E., Cendejas, G., Castro, L., Vázquez, F. (2016) Formulación de polimeros aleatorios para mejorar flujo de crudos del petróleo. Mexican Pat.MX 338859 B.

[27] Lozada, M., Flores, E., Cendejas, G., Castro, L., Vázquez, F. (2016) Formulación de polímeros aleatorios para mejorar flujo de crudos del petróleo. Mexican Pat.MX 338860 B.

[28] Lozada, M., Flores, E., Cendejas, G., Castro, L., Vázquez, F. (2016) Formulación de polímeros aleatorios para mejorar flujo de crudos del petróleo. Mexican Pat.MX 338861 B.

[29] Ramírez, D. Ibíd., p. 88; Ramírez, D. Ibíd., p. 120-122; Ramírez, D. Ibíd., p. 111 y 91; Ramírez, D. Ibíd., p. 115.

[33] Castro, L. V., Flores, E. A., Cendejas, G., Lozada, M., Vázquez, F. (2009). Formulations of random polymers for improving crude petroleum flow, U.S. Pat. No. 9,120,885 B2.

SUMMARY OF THE INVENTION

In contrast, in the present patent application, a new synthesis procedure is reported, characterized by low rates of pre-emulsion addition, the use of surfactants based on ether-alkyl glycols and transfer agents, with high feasibility to be scaled up at industrial level and that allows synthesizing ethylene alkylate-acrylic bipolymers as latex with a high solids content (30<solids content <40 wt %).

The ethylene-acrylic alkylate chains, synthesized by this procedure, show a better performance as removers or destabilizers of complex emulsions in crude oil than other demulsifiers, because of a high randomness of the ethylene alkanoate and acrylic monomers distribution in the chains. The monomers chain distribution of bipolymer of the present invention is schematized in FIG. 1b.

Therefore, the aim of the present invention is to provide bipolymers based on ethylene alkanoate and alkyl acrylates that are capable of removing the emulsified water and the salts dissolved in in these emulsions, formed in different crude oil blends, found in triphasic separation units, for crude oil mixtures with densities from 4 to 35° API, and being more efficient than conventional demulsifiers.

Another aim is to provide a composition of bipolymers based on ethylene alkanoate-acrylic with a distribution highly randomness in the chain (without blocks) to destabilize complex water/crude oil emulsions. A best monomer distribution in the bipolymer chain is schematized in FIG. 1b. Yet another aim is to synthesize latexes of ethylene alkanoate-alkyl acrylate bipolymers, colloidally stable, even at solids contents close to 40 wt %, which makes these latex technically and economically feasible to be scaled up to industrial level.

BRIEF DESCRIPTION OF THE DRAWINGS

In order to have a better understanding of the highly random addition bipolymers to destabilize complex emulsions in crude oil blends of the present invention, a brief description of the drawings is provided below.

DETAILED DESCRIPTION OF THE INVENTION

Figure 1:
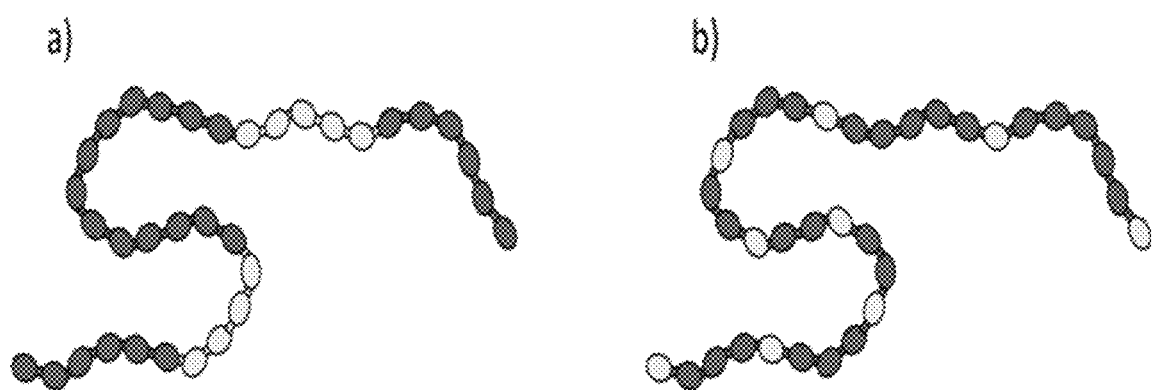
FIG. 1 shows, in schematic form, the bipolymers structure of low randomness, where, (a) long sequences of one of the monomers are observed, as well as the current monomer in smaller numbers is not placed at the ends of the chain [31]; compared with the bipolymers of high randomness and, (b) the monomers distribution in the bipolymers chains is shown, where a better distribution is detected, being able to locate the current monomers in even a fewer amount in the ending fragments of polymeric chain.
Figure 2:
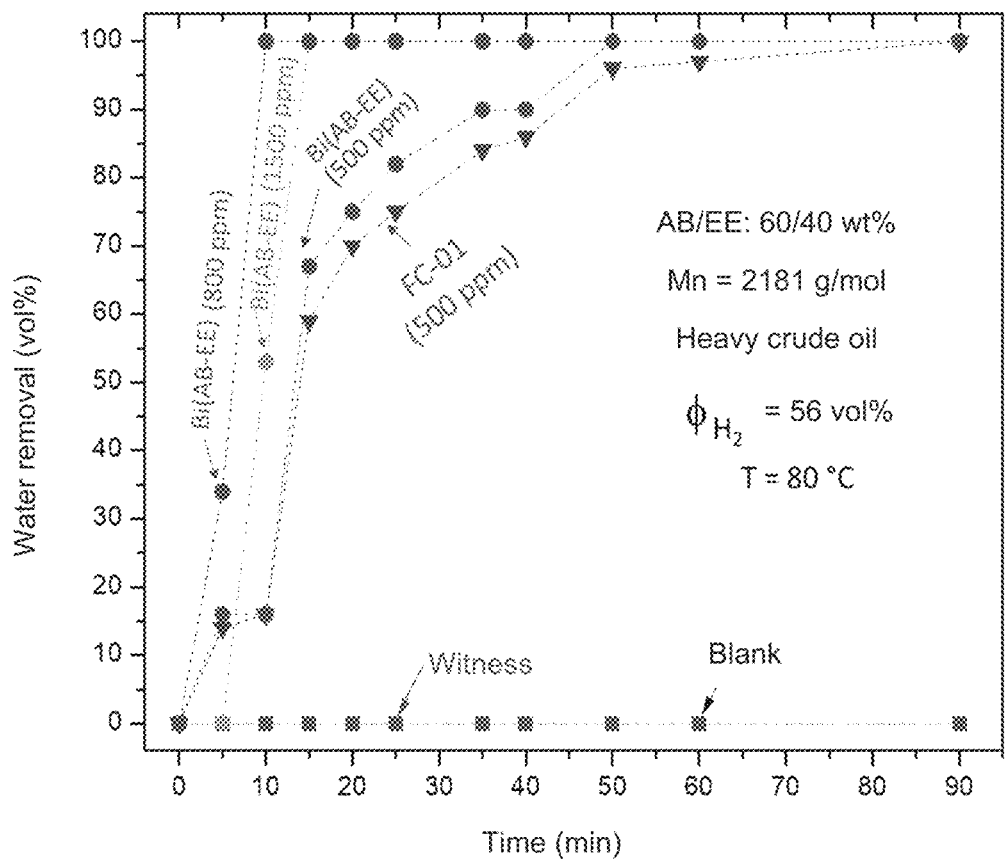
FIG. 2 presents the performance of bipolymers of low randomness, showing a schematic shape, as the reported in FIG. 1a), to destabilize complex emulsions in crude oils blends that are described in the present invention and are presented in order to set forth the dehydrating effect of the BA/EE bipolymer—60/40 wt % ($\overline{M}_n$=2181 g·mol$^{-1}$)-(data taken from Ramírez, D. [30]) and the FC-01 polyethers formulation (results obtained by our research group) at different dosages in a Mexican heavy crude oil ($\phi_{H2O}$=56 vol %, T=80° C.).

The present invention refers to basic compounds for the dehydrating or demulsifying in the crude oil conditioning, specifically, in the application of bipolymers based on ethylene alkanoate-acrylic with a highly random distribution in the bipolymer chain to destabilize complex water-in-crude oil emulsions, with the purpose of removing or destabilizing the emulsified water and the salts dissolved in this water, in the triphasic separation units, for different crude oils blends of API densities between 4 and 35° API. The following method to prepare random bipolymers, based on butyl acrylate and ethylene alkanoate, with application as dehydrating agents, was employed. This method is illustrative but not limiting:

Latex of random bipolymers, based on butyl acrylate and ethylene alkanoate, were synthetized by semi-continuous emulsion polymerization, process described, in general and by way of example, in the U.S. Pat. No. 9,120,885 B2 [33]. The monomers were dosed from an addition tank, containing the pre-emulsion, to the main reactor under careful monomers starved feed conditions, more strict than those reported in literature [29]. In the specific case of the synthesis process, the present patent application and unlike the aforementioned U.S. Pat., the addition rate of the pre-emulsion, that enters toward the main reactor, was set at very low value of $q_{pre-emulsion} \leq 0.009$ g·cm$^{-3}$·min$^{-1}$, while that of the initiator was fixed on $q_{initiator\ solution} \leq 0.0009$ g·cm$^{-3}$·min$^{-1}$, and the reactor temperature was raised until 80° C., to utterly ensure the immediate incorporation of the monomers to the polymeric chain, avoiding the formation of long sequences of the same monomers (see FIG. 1). Once the monomers in a pre-emulsion drop fall into the main reactor, they are immediately incorporated into the polymer chain. The initiator feeding ensures the required flux of free radicals in the reactive system. In this process, the pre-emulsion and latex are stabilized by a sodium salt of alkyl ether glycol, which prevents the precipitation even at high solids content (25.0<S.R<45.0 wt %) and high temperatures (75<T<82° C.). The use of other surfactants, such as those reported in literature [15], does not allow reaching these high solids contents, which are very advantageous from an economic point of view and able to be scaled up at industrial plant level. The composition homogeneity of the synthesized bipolymers, as well as their distribution randomness (that one means a better distribution of the monomers along the polymeric chains) are also guaranteed by this semi-continuous polymerization process. Furthermore, this process allows controlling any reaction exothermy by just adjusting the feeding rate into the polymerization reactor.

Bipolymers are prepared in latex form, which consists of a dispersion of submicron polymeric particles in water, easy to handle, avoiding the use of organic solvents. The water is removed from the obtained latex by distillation at a temperature of 80 to 120° C. and, subsequently, the bipolymer is dissolved in a suitable organic solvent that allows its final applications as a demulsifying agent in crude oils with densities of 4 to 35° API. The ethylene alkanoate-acrylic bipolymer is dissolved in solvents, with boiling points comprised in the range between 35 and 200° C., such as dichloromethane, methanol, ethanol, isopropanol, chloroform, benzene and its derivatives, toluene, xylene, jet fuel, naphtha, individually or as mixture of the aforementioned.

The structure of the different random bipolymers, based on ethylene alkanoate-alkyl acrylate, is shown in Formula (1), comprising in the present invention, preferably, for the second monomer, an alkyl ester of acrylic acid or methacrylic acid:

Structural formula 1

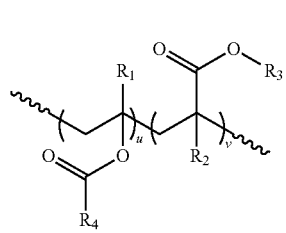

Where:
$R_1$, $R_2$ and $R_3$ are independent radicals represented by the groups;
$R_1$=H, CN, $CH_2CH=CH_2$, $CH_2CH_2CH=CHCCH_2CH_3$;
$R_2$=H, $CH_3$;
$R_3$=$CH_3$, $C_2H_5$, $C_4H_9$, $C_6H_{13}$, $C_8H_{17}$, $C_{10}H_{21}$, $C_{12}H_{25}$, $C_{18}H_{37}$; $R_4$=$CH_3$, Ph, $C_2H_5$, $C_5H_7$, $C_{11}H_{23}$, $C_{17}H_{33}$;

u=ethylene alkanoate monomer number between 1 and 40;
v=number of acrylic monomer number between 1 and 95.

The number average molecular weight (Mn) of the bipolymers are in the range from 1,112 to 11,960 g/mol.

The following alkyl acrylate monomers employed to synthesize the bipolymers object of the present invention, which does not imply any limitation are described as examples: methyl acrylate, ethyl acrylate, butyl acrylate, pentyl acrylate, isobornyl acrylate, isobutyl acrylate, tert-butyl acrylate, hexyl acrylate, 2-ethylhexyl acrylate, 3,5,5-trimetylhexyl acrylate, 2-metoxyetyl acrylate, 2-phenoxyetyl acrylate, 4-tert-butylciclohexyl acrylate, octyl acrylate, iso-decyl acrylate, decyl acrylate, lauryl acrylate, tridecyl acrylate, octadecyl acrylate, and behenyl acrylate. On the other hand, the ethylene alkanoate monomers selected in the present invention, which does not imply any limitation: ethylene ethanoate, cyano ethylene ethanoate, vinyl propynate, ethenyl benzoate, vinyl butyrate, vinyl laurate, and vinyl stearate.

The dehydration method consists in adding an effective amount of random ethylene ethanoate-alkyl acrylate bipolymers to the crude oils, with densities ranging from 4 to 35° API, in concentrations between 10 and 2000 ppm, to provoke the coalescence of emulsified water drops in the aforementioned crude oils.

The present invention is described with reference to a specific number of examples, which are considered as illustrative and not as restrictive. Once obtained, the bipolymers based on butyl acrylate and ethylene ethanoate were characterized using the following instrumental methods.

1.—Size Exclusion Chromatography (SEC), using an Agilent® model 1100 chromatograph, with PLgel column, and employing tetrahydrofuran (THF) as eluent to calculate the distribution of molecular masses of the polymers, as well as the polydispersity index (I).

2.—Fourier Transform-Infrared Spectroscopy (FTIR), using a Thermo Nicolet™ AVATAR 330 spectrometer, using the method of films technique with the OMNIC software, version 7.0™.

3.—$^{13}C$ and DEPT-135 Nuclear Magnetic Resonance (NMR), using a Bruker™ Avance Ill spectrometer, operating at 300 MHz. The deuterated chloroform (CDCl3) was used as solvent and tetramethylsilane (TMS/Si $(CH_3)_4$) as a reference.

The number average molecular weights and polydispersity indexes of the different random bipolymers based on ethylene alkanoate-alkyl acrylate bipolymers are listed in Table 1; while, their spectroscopic characteristics are also reported, which does not imply any limitation:

TABLE 1

Characteristics of ethylene alkanoate-acrylic bipolymers, synthetized by the semicontinuous emulsion polymerization process, described in this document (T = 80° C., $q_{pre-emulsion}$ = 0.008 g · cm$^{-3}$ · min$^{-1}$) y $q_{initiator\ solution}$ = 0.0008 kg · L$^{-1}$ · min$^{-1}$).

| Bipolymer | WEIGHT RATIO (WT %) | SOLID CONTENT (WT %) | CONVERSION FINAL (%) | $\overline{M}_n$ (g · mol$^{-1}$) | POLYDISPERSITY INDEX (I) |
|---|---|---|---|---|---|
| BV-640 | 60/40 | 39.05 | 97.63 | 4450 | 3.70 |
| BV-641 | 60/40 | 39.93 | 99.83 | 4107 | 2.89 |
| BV-642 | 60/40 | 39.98 | 99.95 | 3668 | 2.52 |
| BV-643 | 60/40 | 39.99 | 99.98 | 3297 | 2.55 |
| BV-644 | 60/40 | 39.98 | 99.95 | 3092 | 2.42 |

EXAMPLES

The following examples are presented to illustrate the spectroscopic characteristics of random bipolymers based on butyl-acrylate-ethylene ethanoate employed as dehydrating agents to remove or destabilize complex petroleum emulsions.

These examples should not be considered as limiting what herein is claimed.

Example 1: Ethylene alkanoate-acrylic bipolymers, BV series. Random bipolymer based on butyl acrylate-ethylene ethanoate, characteristic signals of the FTIR spectroscopy, ν cm$^{-1}$: 2966, 2937, 2876, 1736, 1448, 1365, 1233, 1172, 1020, and 945.

Characteristic signals of the 13C NMR spectroscopy, δ (ppm): 174.60, 70, 50, 64.44, 41.23, 31.77, 30.61, 29.77, 20.88, 20.57, 19.10, 14.14, and 13.74.

Figure 3:
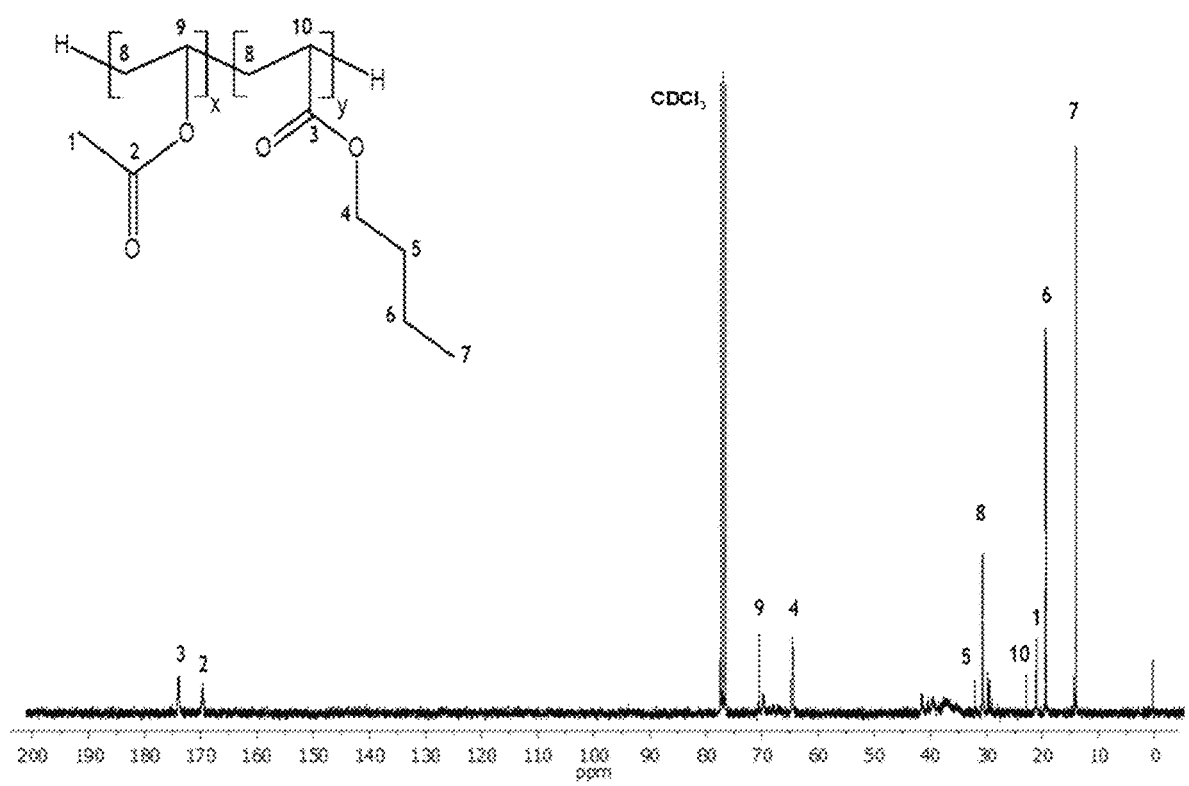
FIG. 3 displays the 13C NMR spectrum of the BA/EE acrylic-ethylene ethanoate bipolymer, 60/40 wt %, $\overline{M}_n$=2181 g·mol$^{-1}$, reported by Ramírez, D. [32], this bipolymer show a schematic shape of low randomness to destabilize complex emulsions in crude oil blends as was reported in FIG. 1(a).
Figure 4:
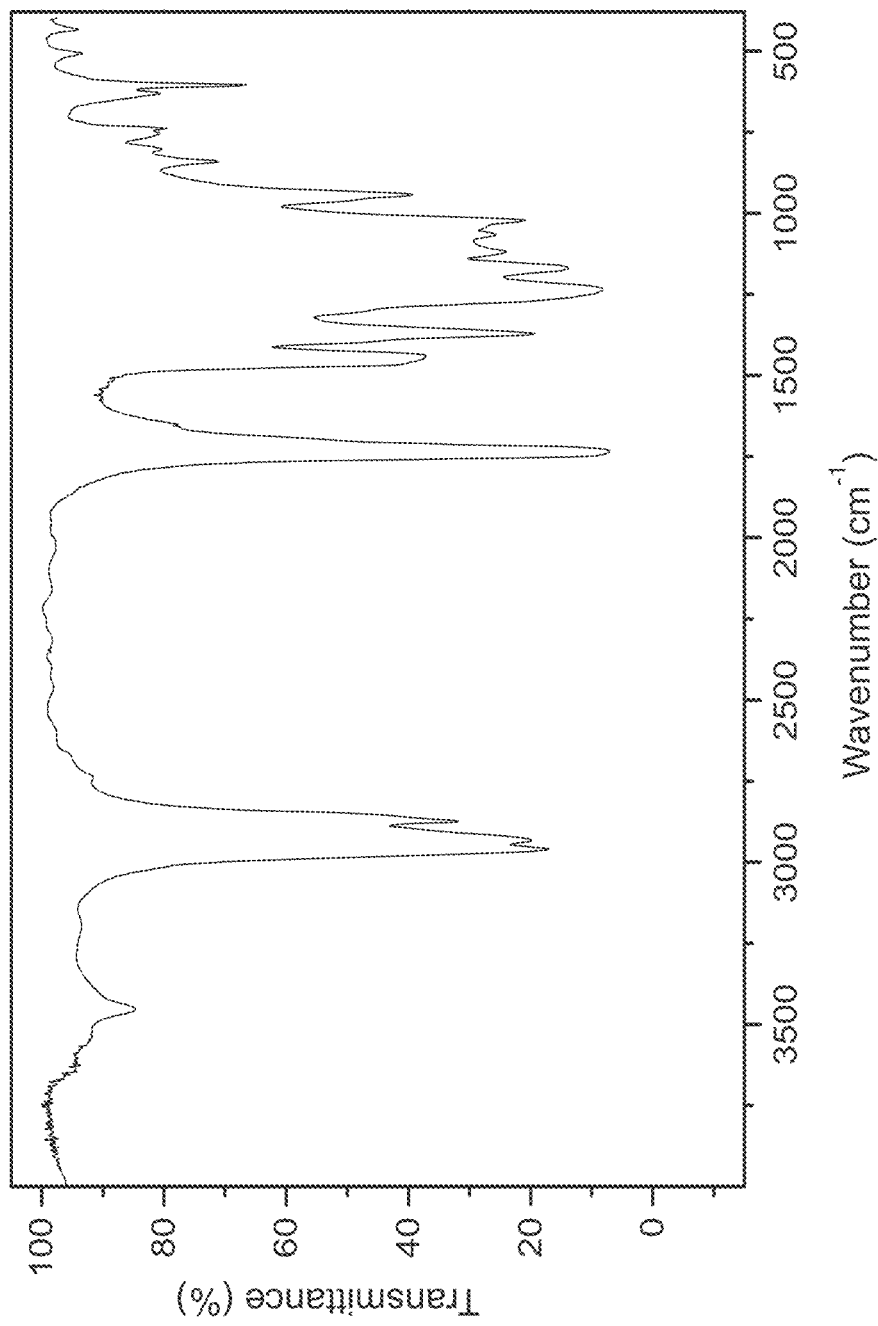
FIG. 4 shows the FTIR spectrum of BV-642 random ethylene ethanoate-acrylic bipolymer of the present invention, where the characteristic bands of the functional groups are identified (BA/EE composition 60/40 wt %, $\overline{M}_n$=3668 g·mol-1).
Figure 5:
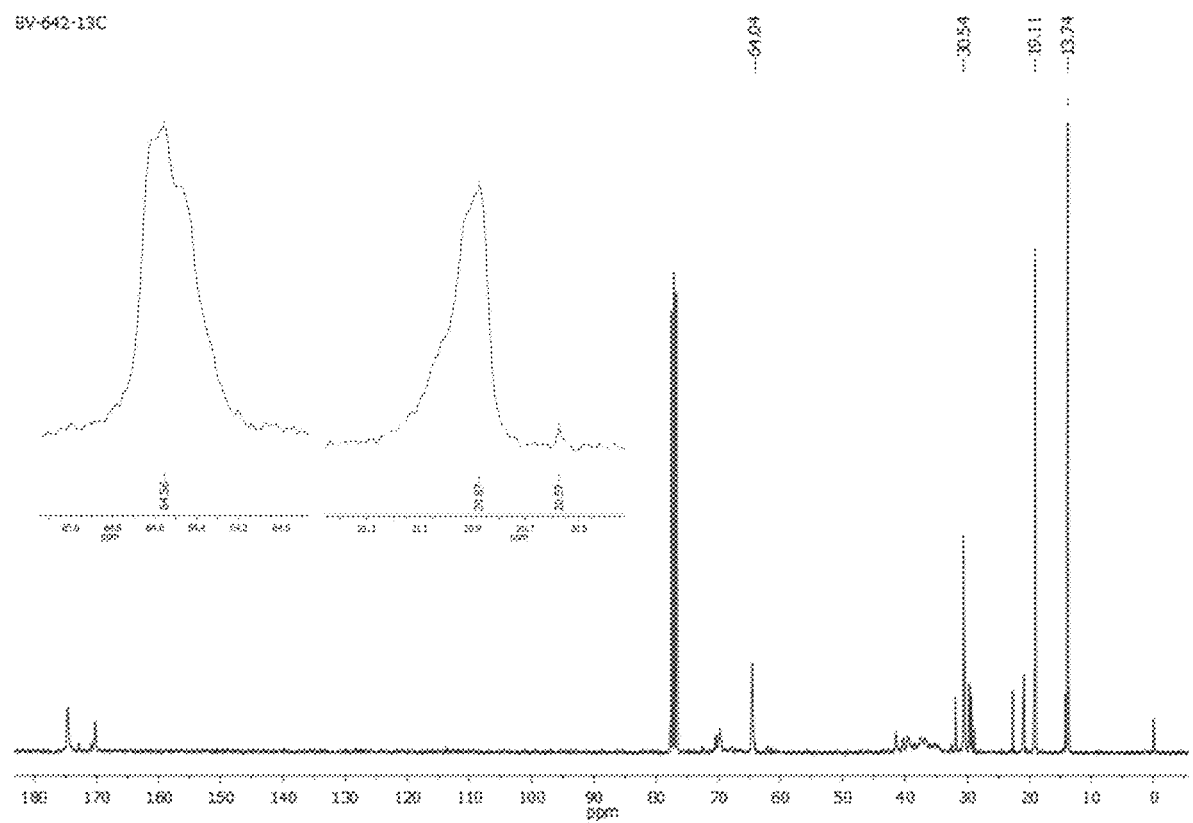
FIG. 5 displays the 13C NMR spectrum of BV-642 random bipolymer of the present invention, where its main signals are identified (BA/EE composition: 60/40 wt %, $\overline{M}_n$=3668 g·mol$^{-1}$). In the upper left part is shown the signal enlargement at δ=69.78, 20.88 and 20.57 ppm, since it is essential that the BV random bipolymer contains these signals to prove its high randomness.
Figure 6:
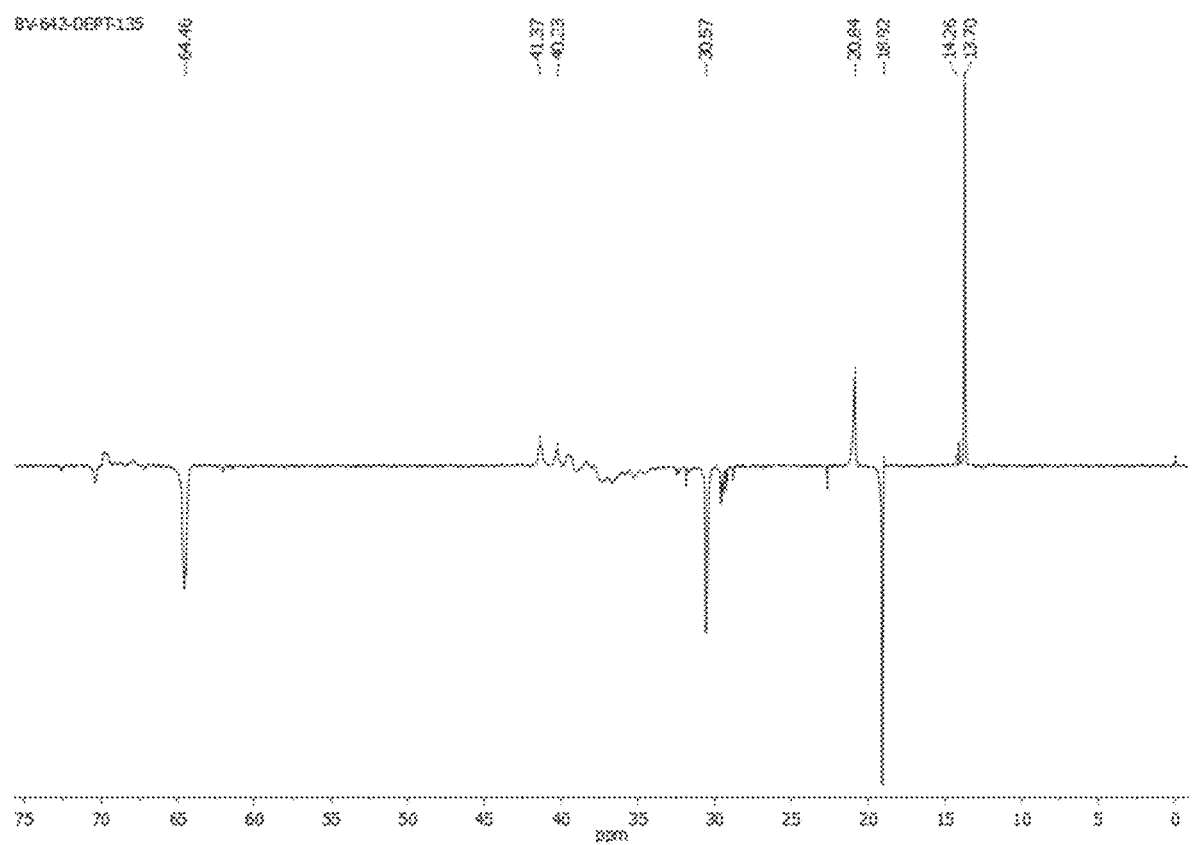
FIG. 6 shows the DEPT-135 NMR spectrum of the random acrylic-ethylene ethanoate bipolymer of the present invention (BV-642, BA/EE composition 60/40 wt %, $\overline{M}_n$=3668 g·mol$^{-1}$), which has been used for the assignment of the signals of each carbon atoms, according to their type ($CH_3$, $CH_2$ or CH).
Figure 7:
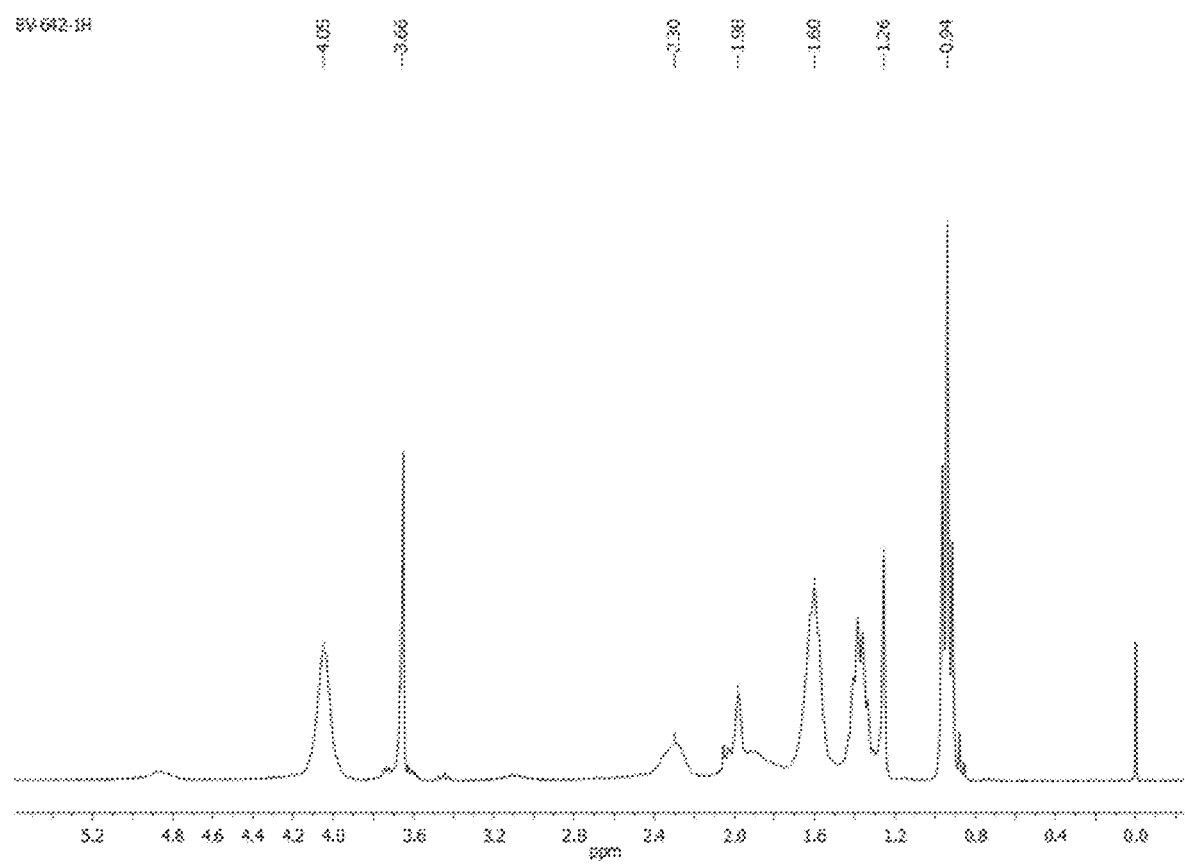
FIG. 7 shows the 1H NMR spectrum of the random bipolymer of the present invention, (BV-642, AB/EE composition of 60/40 wt %, $\overline{M}_n$=3668 g·mol$^{-1}$), where the main signals are identified.

$^{1H}$ NMR δ (ppm): 4.87, 4.05, 3.65, 2.31, 2.06, 1.98, 1.60, 1.38, 1.26, and 0.94. The signal at 20.88 ppm, corresponding to the methyl group in the ethylene ethanoate structure, appears as a very broad signal, because of a different chemical environment surrounding to this methyl group in the polymeric chain of bipolymer identified as BV in the present patent application, which indicates a high randomness of the system. If the amplitude of the signal were to decrease, this would indicate a lower number of interactions with the acrylic comonomers and, therefore, there would be a chain with long structural sequences, both of ethylene ethanoate units and of acrylic units, which is typical of a bipolymer in block (to compare with the spectrum in FIG. 3, where the signal is narrow and incipient). Additionally, the signal at 20.57 ppm is assigned to the methyl group of the ethylene ethanoate units that are found at the end of the polymeric chain. If this signal is not observed, as in the spectrum of the COP-04 copolymer, it means that long sequences (blocks) of ethylene ethanoate have been formed, and only acrylic terminal units can have at the ends of the chains.

Example 2. COP-04 ethylene alkanoate-acrylic copolymer. In order to show the structural advantages of the ethylene alkanoate-acrylic bipolymers synthetized through the semicontinuous emulsion polymerization process, under strict conditions of monomer deficiency that we have developed, the COP-04 ethylene ethanoate-acrylic copolymer was obtained, following the procedure reported by Ramirez, D. [29], with which the synthesis was carried out at a high rate of addition of monomers and at a relatively low temperature (70° C.). The results of the synthesis of a 100 g batch of this dehydrating agent are shown in Table 2.

TABLE 2

Characteristics of the COP-04 latex synthetized by semicontinuous emulsion polymerization, following the procedure reported by Ramirez, D. [29].

| Key | Final conversion (%) | Solids content (wt %) | $\overline{M}_n$ (g · mol) | Poly-dispersity |
|---|---|---|---|---|
| COP-04 | 100 | 20.40 | 2198 | 3.4 |

It is important to note that, by this procedure (Ramírez, D. [29]), only solids contents of around 20 wt % are obtained, since at higher polymer concentrations the latex precipitation occurs. In contrast, the latexes synthesized by the process object of the present patent application reached solids content of 40 wt %, without any problem of colloidal precipitation (see Table 1).

The sample obtained was subjected to gentle evaporation for 48 h in an over at 60° C. Once the dry ethylene ethanoate-acrylic bipolymer was obtained, the NMR characterization of bipolymer was carried out, in order to determine the randomness of the monomers distributed along the chains. The NMR spectra are reported in FIGS. 3 and 8. Regarding the 13C-NMR spectrum for the COP-04 copolymer in FIG. 3, the terminal methyl signal at 20.66 ppm, corresponding to the final structural units of ethylene ethanoate, could not be detected when the chains end by a disproportionation mechanism.

Figure 8:
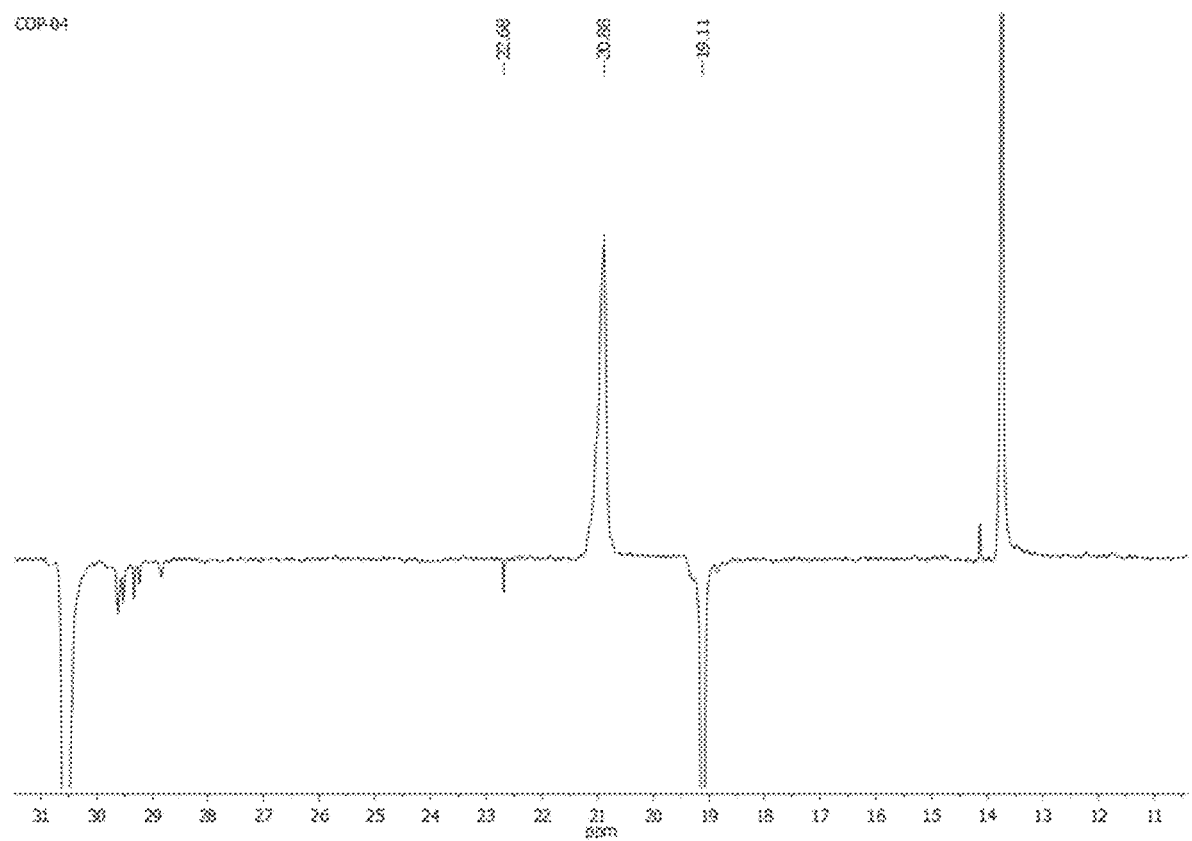
FIG. 8 shows the DEPT-135 NMR spectrum of COP-04 copolymer, synthesized according to the procedure reported by Ramírez, D. [29], with an AB/EE composition of 60/40 wt %, $\overline{M}_n$=2198 g·mol$^{-1}$.

This characteristic was further evidenced in the DEPT-135 spectrum (FIG. 8). The complete absence of the methyl signal from the terminal vinyl units indicates that the bipolymer is made up of sequence of considerable length (block) of vinyl units, with acrylic structural units always located at the ends. These characteristics of the sequence distribution in the chains of the COP-04 copolymer contrast with those revealed by the NMR characterization of the random BV bipolymer sample.

Once the sample of COP-04 ethylene alkanoate-acrylic copolymer has been characterized, it was dissolved in xylene at concentration of 35 wt %.

Example 3. FC-01 commercial polyethers formulation. In addition to evaluating the performance of a series of highly randomized ethylene alkanoate-acrylic bipolymers and of one ethylene alkanoate-acrylic bipolymer synthesized with a laboratory level procedure as dehydrating agent of crude oils blends, the commercial formulation labeled as FC-01 was obtained, widely used in the oil industry, in order to contrast the performance as dehydrating agent of crude oil of both ethylene alkanoate-acrylic polymers and polyethers. Table 3 describes the polymers that comprise the FC-01 formulation, made up of four triblock bipolymers based on polyethers, each one of them with a specific function as an emulsion breaker, coalescer of water droplets dispersed in crude oil or clarifier of the aqueous phase. The fact that the FC-01 dehydrating formulation has been made up by mixing several polyethers (dehydrating basics), which contributes to be more expensive that a formulation comprises by only one basic, the similar cost, dissolved in an appropriate solvent. In contrast, the ethylene alkanoate-acrylic bipolymers, object of the present invention, are basics that work without the need to be formulated in mixtures, since a single molecule possesses the three demulsifying functions-breaking, coalescing and clarifying-. The integration of the three properties in a single molecule represents a huge advantage over the commercial formulation, since the demulsifying product is prepared in a single reactive stage and do not require another mixing stage.

TABLE 3

Characterization components of the FC-01 commercial formulation, including number average molecular weight ($\overline{M}_n$) and POP/POE composition (wt %).
FDH-1 formulation

| Key name | $\overline{M}_n$ (g · mol$^{-1}$) | POP/POE composition (wt %) |
|---|---|---|
| TP 89 | 7750 | 90/10 |
| TP 03 | 5330 | 70/30 |
| TP 14 | 3050 | 60/40 |
| TP 71 | 1400 | 90/10 |

Example 4. Evaluation of the random bipolymers based on butyl acrylate and ethylene ethanoate as dehydrating agents in crude oils with densities from 4 to 35° API. Different concentrated solutions of each of the synthesized bipolymers were prepared, from 4 to 35 wt %, using solvents whose boiling point is comprised in the range of 35 to 200° C., such as dichloromethane, methanol, ethanol, isopropanol, chloroform, benzene, toluene, xylene, jet fuel, naphtha, individually or in mixtures of them, thus that, small volumes of the solution were added to avoid any e effect of the solvent on the removal of water from the evaluated crude oil. Bipolymers based on butyl acrylate and ethylene ethanoate were evaluate at concentrations ranging from 10 to 2000 ppm.

The ethylene alkanoate-acrylic bipolymers, object of the present invention, were evaluated simultaneously, by way of comparison, with a dehydrating agent, specifically, the COP-04 ethylene alkanoate-acrylic copolymer (Table 2), synthesized with the laboratory procedure reported by Ramirez, D.

[29]. The dehydrating performance of the new ethylene alkanoate-acrylic bipolymers, object of this invention, was also contrasted with the FC-01 commercial dehydrating formulation, comprising of four block polymers derived from propylene and ethylene oxides (Table 3).

The evaluation procedure is described following: the number of oblong bottles provided with insert and cover is indicated by the number of compounds to evaluate, plus one bottle corresponding to crude oil without demulsifier (blank); in each one of the bottles was added the crude oil sample up to the 100 mL mark. All the bottles were placed in a temperature-controlled water bath at 80° C. for 20 minutes, at the end of this time, the aliquot of the solutions of the random bipolymers base on ethylene alkanoate-acrylic, the COP-04 copolymer and the FC-01 commercial product ( ) was added; all bottles were shaken for 3 minutes at the rate of two strokes per second. After being purged each bottle, these were placed again in the temperature-controlled water bath and the breakdown of the water-in-oil emulsion was measured every 5 minutes during the first hour; subsequently, each hour, until the end of the assessment (5 h). All the random bipolymers, that are the subject of this invention, as well as the referents, ethylene alkanoate-acrylic bipolymer and the commercial formulation based on polyethers, were evaluated at different concentrations in the range between 10 and 2000 ppm.

The $MCO_1$, $MCO_2$, $MCO_3$ and $MCO_4$ crude oils, that were used in the evaluation of the random bipolymers based on butyl acrylate-ethylene ethanoate as dehydrating agents, were characterized as shown in Table 4

Crude oils mixtures with a considerable amounts of asphaltenes were used in this assessment, which causes the formation of complex emulsions that are difficult to remove. Even the $MCO_3$ blend, formed mainly by light crude oil, has asphaltene aggregates of large size, as shown in the first micrograph of FIG. 16. The morphology of the complex emulsions formed in these crude oil blends, with high amounts of asphaltenes, is reported in FIGS. 10, 14, 16 and 18.

TABLE 4

Characteristics and properties of crude oil blends used to evaluate the performance as dehydrating agents of highly random ethylene alkanoate-acrylic bipolymers.

| Property | $MCO_1$ | $MCO_2$ | $MCO_3$ | $MCO_4$ |
| --- | --- | --- | --- | --- |
| API gravity (°) | 20.17 | 33.1 | 4.64 | 21.09 |
| Salt content (lb · mbb$^{-1}$) | 18476 | 104 | 17774 | 22045 |
| Paraffins content (wt %) | 2.68 | 1.14 | 0.52 | 1.95 |
| Runoff temperature (° C.) | −27 | −45 | −20 | −27 |
| Water by distillation (vol %) | 22.2 | 39.0 | 72.6 | 6.0 |
| Water and sediments (vol %) | 26.3 | 39.4 | 78.7 | 6.1 |
| $\overline{M}_n$ by cryoscopy (g · mol$^{-1}$) | 307 | 232 | 376 | 367 |
| n-Heptane insoluble fraction (wt %) | 15.78 | 2.78 | 12.43 | 13.56 |
| Saturates (wt %) | 18.68 | 7.63 | 9.03 | 26.45 |
| Aromatics (wt %) | 26.38 | 72.93 | 56.01 | 27.12 |
| Resins (wt %) | 40.35 | 16.40 | 22.90 | 33.23 |
| Asphaltenes (wt %) | 14.59 | 3.04 | 12.06 | 13.20 |

As a manner of demonstration, which does not imply any limitation, FIGS. 9, 11, 13, 15, and 17 display the obtained performance in the assessment as dehydrating agents of the new ethylene alkanoate-acrylic bipolymers and the reference compounds, that were previously described; while FIGS. 10, 12, 14, 16, and 18 show the images of the bottles and micrographs of the samples of crude oils blends after the evaluation.

Figure 9:
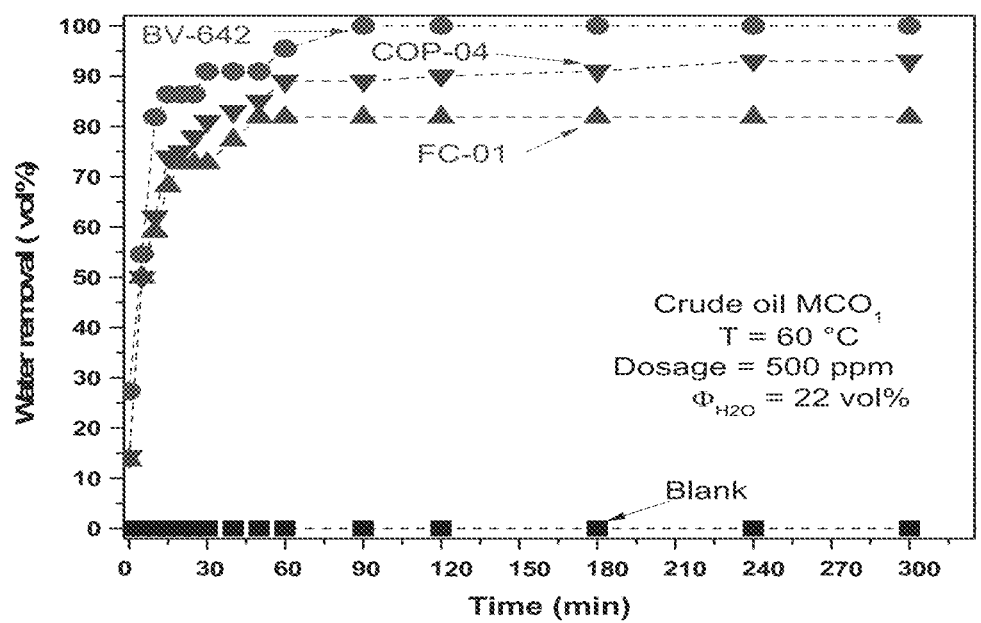
FIG. 9 presents the performance as dehydrating agents of heavy crude oil ($MCO_1$) ($\phi_{H2O}$=22 vol %; T=60° C.; 20.17° API) of the random bipolymer based on ethylene ethanoate-acrylic of the present invention (BV-642, AB/EE composition of 60/40 wt %, $\overline{M}_n$=3668 g·mol$^{-1}$), the COP-04 ethylene ethanoate-acrylic copolymer (AB/EE composition of 60/40 wt %, $\overline{M}_n$=2198 g·mol$^{-1}$) and the FC-01 commercial formulation at a dosage of 500 ppm.

Example 5. Evaluation of the BV-642 random bipolymer, COP-04 copolymer and FC-01 commercial formulation as dehydrating agents in the $MCO_1$ crude oil with API gravity of 20.17°. FIG. 9 shows the demulsifying performance of the BV-642 random bipolymer, COP-04 copolymer and FC-01 commercial formulation, dosed at 500 ppm in the $MCO_1$ crude oil, with a gravity of 20.17° API ( ) The BV-642 demulsifier induces a higher rupture of the emulsion in comparison with the COP-04 copolymer and FC-01 formulation, besides that it displays a greater coalescence rate throughout the whole period of evaluation, achieving the total removal of emulsified water after 90 min. Concerning the COP-04 demulsifier, a slightly greater coalescence rate was observed compared with the FC-01 commercial formulation, reaching its maximum WRE, 93 vol %, after 240 min of the assessment; in contrast, the FC-01 polyethers formulation solely removed 82 vol % at 50 min of the evaluation, staying in this value until the end of the test. Finally, the blank did not show any breakdown, which demonstrates that the emulsion is colloidally stable during the whole period of evaluation.

Figure 10:
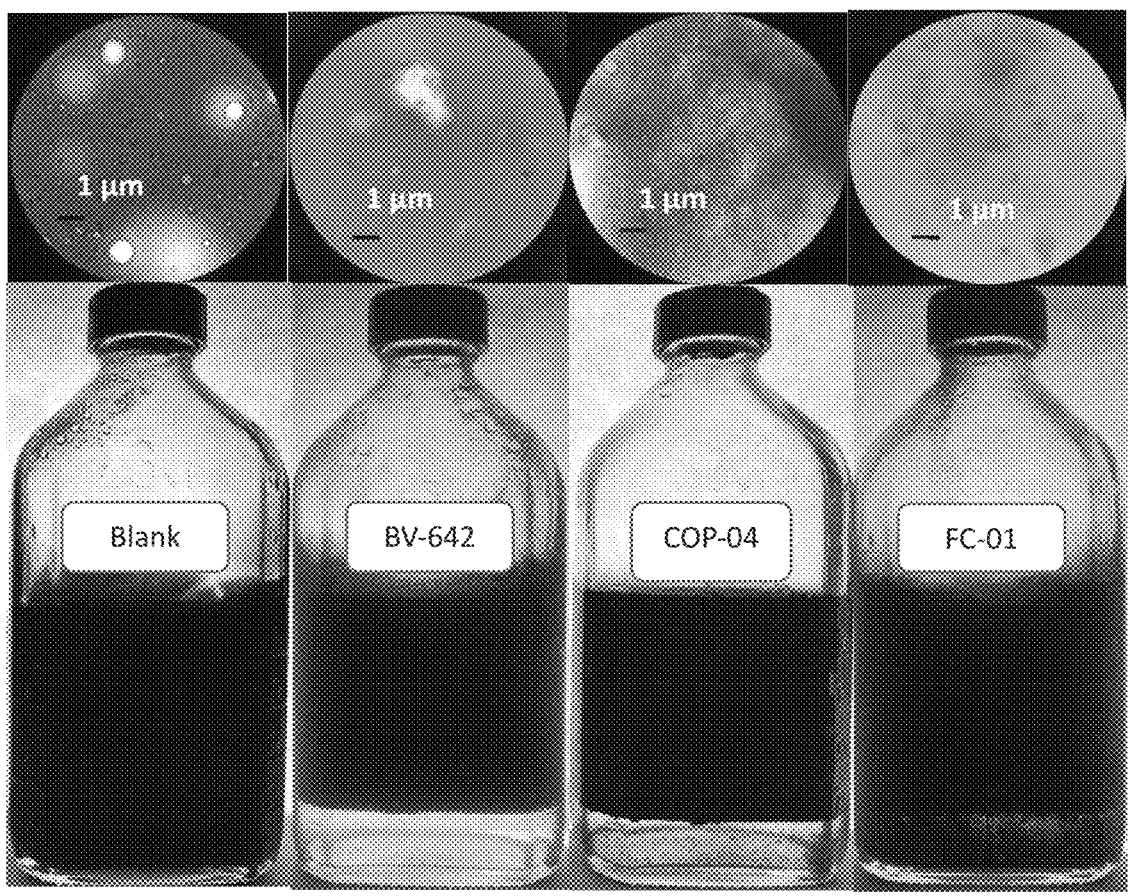
FIG. 10 illustrates the bottle images and micrographics of MCO$_1$ heavy crude oil of 20.17° API after the assessment with the random BV-642 bipolymer (AB/EE composition of 60/40 wt %, $\overline{M}_n$=3668 g·mol$^{-1}$), COP-04 ethylene ethanoate-acrylic copolymer (AB/EE composition of 60/40 wt %, $\overline{M}_n$=2198 g·mol$^{-1}$), and the FC-01 commercial formulation at a dosage of 500 ppm.

The water removal efficiencies of the BV-642 random bipolymer, COP-04 copolymer and FC-01 commercial formulation in the $MCO_1$ crude oil are compared in FIG. 10; on the other hand, it is shown the bottle corresponding to the blank and, since no rupture of the emulsion was detected, is assumed that the dispersion in the $MCO_1$ crude oil blend is colloidally stable. Firstly, regarding the micrograph of the blank, $MCO_1$ without any additive, a yellowish halo surrounding a ring of organic matter was observed around the water droplets, which indicates the presence of two physical barriers that hinder the coalescence of the water droplets. Subsequently, it is observed in the bottles that the BV-642 bipolymer induced a homogeneous rupture of the phases, same that is comparable to the induced by the COP-04 ethylene alkanoate-acrylic copolymer and FC-01 formulation. On the other hand, it is observed in the sample of $MCO_1$ crude oil blend containing the BV642 bipolymer a total absence of water droplets, confirming the complete removal of emulsified water and the presence of paraffins (shining yellow matter) dispersed in crude oil; whereas for the COP-04 copolymer can be appreciated some water droplets of less than 1 µm, surrounded by a fine layer of asphaltenes, which, evidently, are also dispersed in the medium. Lastly, the FC-01 commercial formulation induces a bad clarification of the aqueous phase, in contrast with the excellent clarification induced by the BV-642 bipolymer and the COP-04 copolymer. It is observed in this micrograph a greater quantity of water droplets surrounded by a thick halo of asphaltenes; besides this agglomerated organic matter that is clearly dispersed in the crude oil, is observed, which allows inferring that the FC-01 formulation was not capable of completely displacing the layer of asphaltenes in the water/crude oil interface. The superior dehydrating efficiency of the BV-642 alkyl acrylate-ethylene ethanoate, as well as the homogeneity of the rupture and the excellent induced clarification, represent clear advantages as demulsifying agent in comparison with the COP-04 copolymer and FC-01 formulation.

Figure 11:
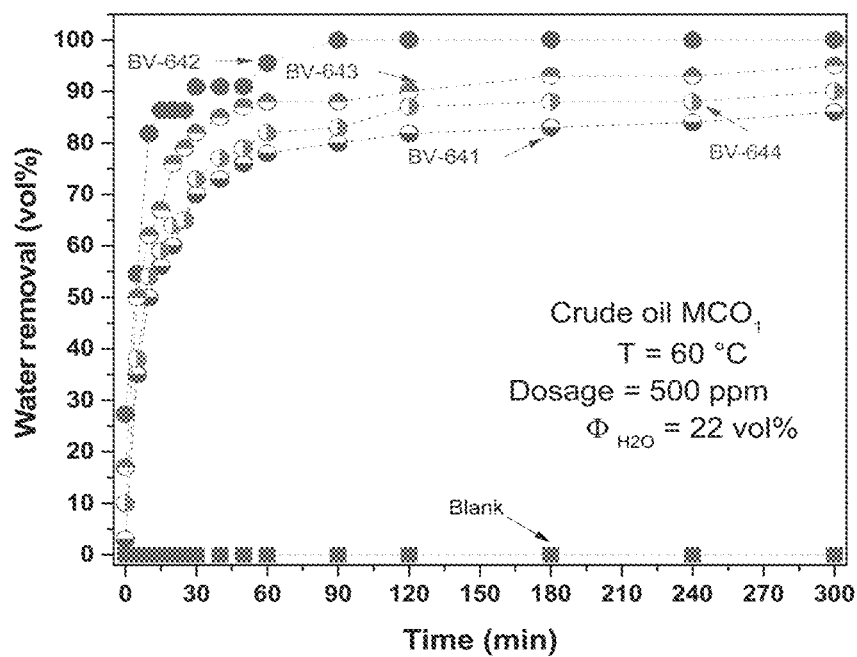
FIG. 11 shows the performances as dehydrating agents of the MCO$_1$ heavy crude oil ($\phi_{H2O}$=22 vol %; T=60° C.; 20.17° API) for the series of random bipolymers based on alkyl acrylate and ethylene ethanoate of different molecular weights at a dosage of 500 ppm. It is observed that the water removal strongly depends on the number average molecular weight of the highly random BV acrylic/ethylene alkanoate bipolymers (composition of AB/EE: 60/40 wt %, $\overline{M}_n$=4107 g·mol$^{-1}$ (BV-641), 3668 g·mol$^{-1}$ (BV-642), 3297 g·mol$^{-1}$ (BV-643), and 3092 g·mol$^{-1}$ (BV-644)).

Example 6. Evaluation of random bipolymers based on butyl acrylate and ethylene ethanoate with different average molecular mass as dehydrating agents in the $MCO_1$ crude oil with API gravity of 20.17°. FIG. 11 shows the water removal efficiencies of the BV-641 random bipolymers based on butyl acrylate-ethylene ethanoate (acrylic/ethylene alkanoate composition, BB/EE: 60/40 wt %, $\overline{M}_n$=4107 g·mol$^{-1}$), BV-642 (acrylic/ethylene alkanoate composition, BA/EE:

60/40 wt %, $\overline{M}_n$=3668 g·mol$^{-1}$), BV-643 (acrylic/ethylene alkanoate composition, BA/EE: 60/40 wt %, $\overline{M}_n$=3297 g·mol$^{-1}$) and BV-644 (acrylic/ethylene alkanoate composition, BA/EE: 60/40 wt %, $\overline{M}_n$=3092 g·mol$^{-1}$) in the MCO$_1$ crude oil. It could be appreciated that the BV-642 bipolymer removed all the emulsified water, being the one to achieve it. On the other hand, the BV-643 bipolymer removed 95 vol %, displaying a lower coalescence rate than the BV-642 bipolymer. The BV-641 bipolymer separated 90 vol % of the emulsified water, exhibiting a slightly lower coalescence rate than the BV-643 bipolymer. Finally, the BV-644 bipolymer displayed the lowest dehydrating efficiency of all BV bipolymers, removing 86 vol % of the emulsified water. As can be seen, the molecular mass of the synthesized bipolymers influences in their efficiency as dehydrating agents.

Figure 12:
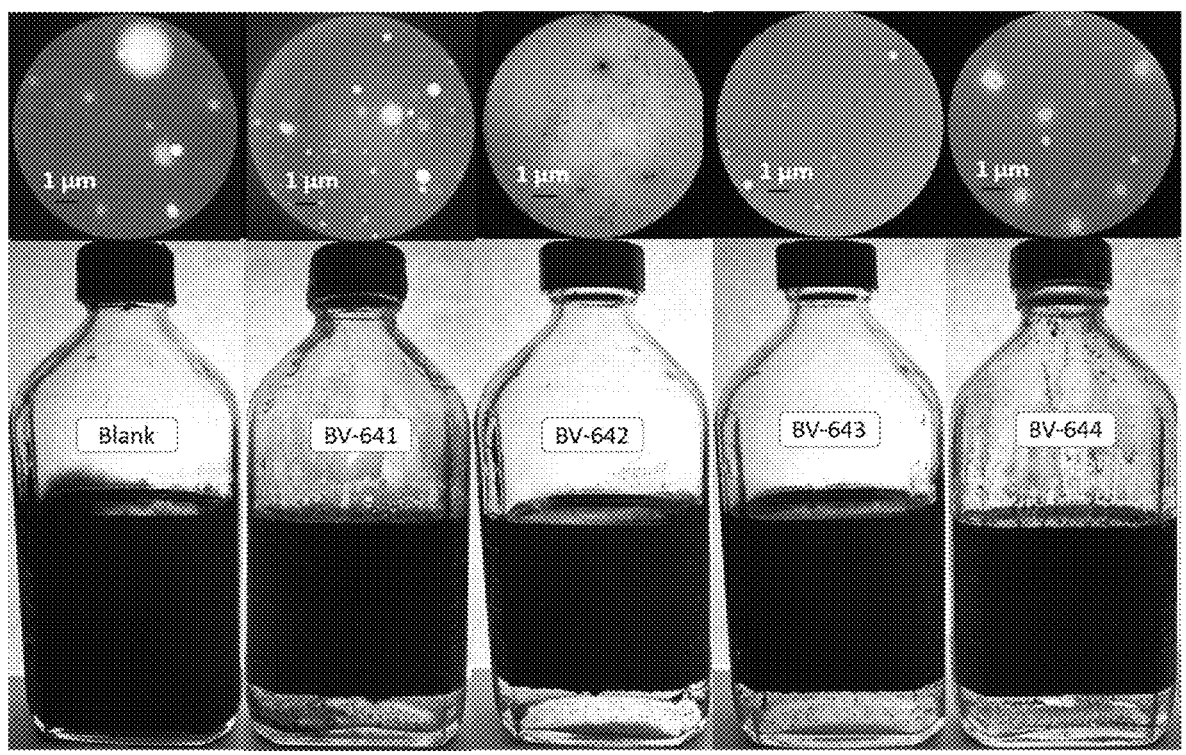
FIG. 12 shows the bottles images and micrographics of the heavy crude oil of 20.17° API (MCO$_1$) after the assessment of the series of random bipolymers based on alkyl-ethylene ethanoate of different molecular weights at a dosage of 500 ppm. It is observed the water removal strongly depends of the number average molecular weight of the highly random BV acrylic/ethylene alkanoate bipolymers (composition, AB/EE: 60/40 wt %, $\overline{M}_n$=4107 g·mol$^{-1}$ (BV-641), 3668 g/mol (BV-642), 3297 g·mol$^{-1}$ (BV-643) and 3092 g·mol$^{-1}$ (BV-644)).
Figure 13:
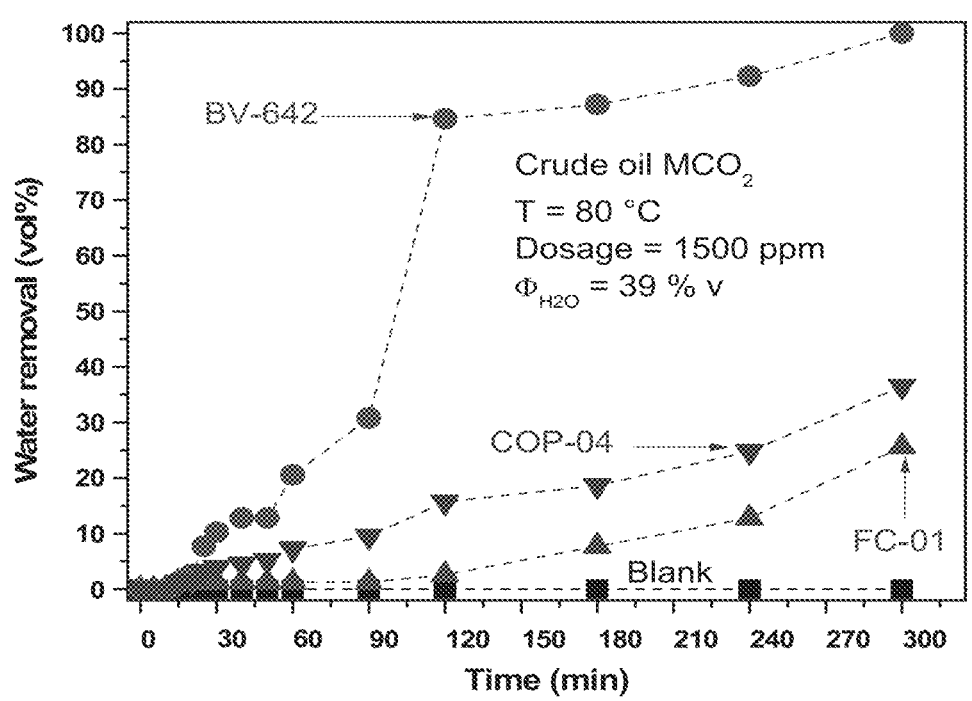
FIG. 13 shows the performance as dehydrating agents in the MCO$_2$ light crude oil ($\phi_{H2O}$=39 vol %; T=80° C.; 33.1° API) of the random BV-642 bipolymer based on alkyl acrylate-ethylene ethanoate of the present invention (AB/EE composition of 60/40 wt %, $\overline{M}_n$=3668 g·mol$^{-1}$), COP-04 ethylene ethanoate-acrylic copolymer (AB/EE composition of 60/40 wt %, $\overline{M}_n$=2198 g·mol$^{-1}$), and the FC-01 commercial formulation at a dosage of 1500 ppm.

It can be seen in FIG. 12 the absence of emulsified water in the micrograph of the crude oil treated with the BV-642 bipolymer. Concerning the BV-641, BV-643, and BV-644 bipolymers, it can be observed residual water droplets in the micrographs of the MCO$_1$ crude oil treated with the aforesaid bipolymers; however, the quantity of observed water droplets is considerably lower to the observed in the micrograph of the blank.

Example 7. Evaluation of the BV-642 random bipolymer, COP-04 copolymer and FC-01 commercial formulation as dehydrating agents in the MCO$_2$ crude oil with API gravity of 33.1°. It is displayed in FIG. 13 the dehydrating performance of the BV-642 bipolymer and FC-01 commercial formulation in the MCO$_2$ light crude oil (33.1°API), dosed at 1500 ppm. As can be observed, the three demulsifying agents start the breakdown of the emulsion after 15 min; however, the BV-642 random bipolymer presents a higher coalescence rate during the whole evaluation and, at 300 min of the assessment, achieves the removal of 100 vol % of the emulsified water. On the other hand, the COP-04 bipolymer presented a greater coalescence rate and removal efficiency than the FC-01 commercial formulation, removing 37 and 26 vol %, respectively. Lastly, the blank did not show any breakdown, therefore, it must be concluded that the emulsion is colloidally stable throughout the whole period of evaluation.

Figure 14:
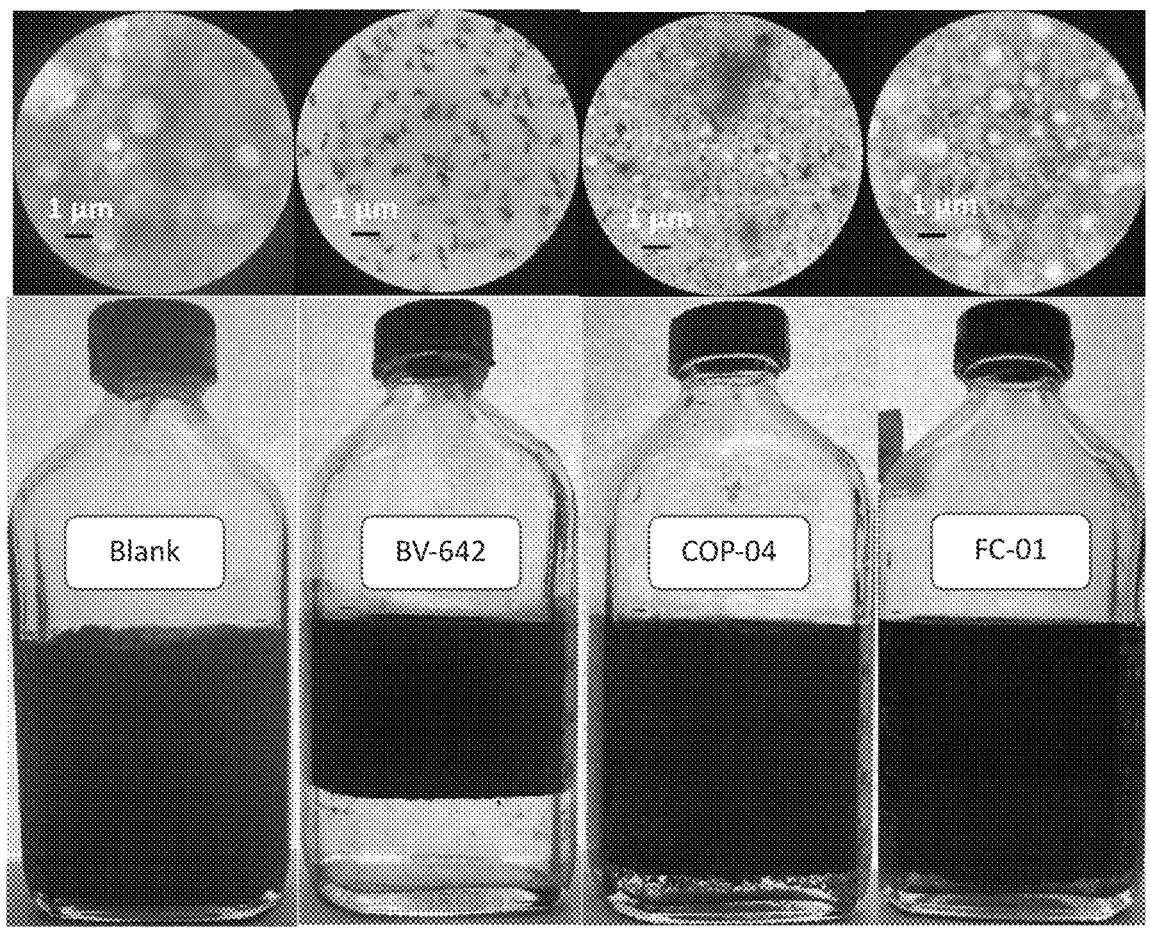
FIG. 14 shows the bottles images and micrographs of the light crude oil of 33.1°API (MCO$_2$) after the assessment with the random BV-642 bipolymer (AB/EE composition of 60/40 wt %, $\overline{M}_n$=3668 g·mol$^{-1}$), COP-04 ethylene ethanoate-acrylic copolymer (AB/EE composition: 60/40 wt %, $\overline{M}_n$=2198 g·mol$^{-1}$), and the FC-01 commercial formulation at a dosage of 1500 ppm.

FIG. 14 shows that the blank of the MCO$_2$ crude oil sample does not present rupture of the emulsion throughout the period of assessment to determine the dehydrating efficiencies of demulsifying agents. On the other hand, the micrograph of the blank presents water droplets with a size polydispersed system, where the water droplets are surrounded by a thick layer of asphaltenes, despite being, theoretically, a light crude oil (33° API). The presence of these huge asphaltenes agglomerates is caused by the incorporation of a small fraction of crude oil in the mixture, as well as residues coming from cleaning operations of the wells. Despite the presence of these asphaltenic agglomerates, which stabilize the emulsion and hinder the diffusion of the chemical products, the BV-642 random bipolymer was capable of removing the total amount of emulsified water, and also presented homogeneous interfacial rupture and excellent clarification. It was observed in the micrograph of the organic phase of this bottle a great quantity of asphaltenes agglomerates; while the absence of water droplets confirmed the total removal of emulsified water. On the other hand, the COP-04 copolymer showed a slightly non homogeneous rupture of the organic and aqueous phases, comparable to that of the FC-01 formulation; however, the clarification of the aqueous phase of both demulsifiers is quite similar to the obtained using the BV-642 bipolymer. The micrograph in the upper part of the sample with COP-04 revealed a system with water droplets of monodisperse size, where the asphaltenes are agglomerated and dispersed in the organic phase. Conversely, the sample with the FC-01 formulation allowed observing a system with polydispersed drop diameters, with a slight layer of asphaltenes surrounding the water droplets. Based on the above, it is evident that the FC-01 commercial formulation is not capable of displacing the asphaltenes, which are present in the light crude oil stream, in contrast with the BV-642 bipolymer and COP-04 copolymer.

Figure 15:
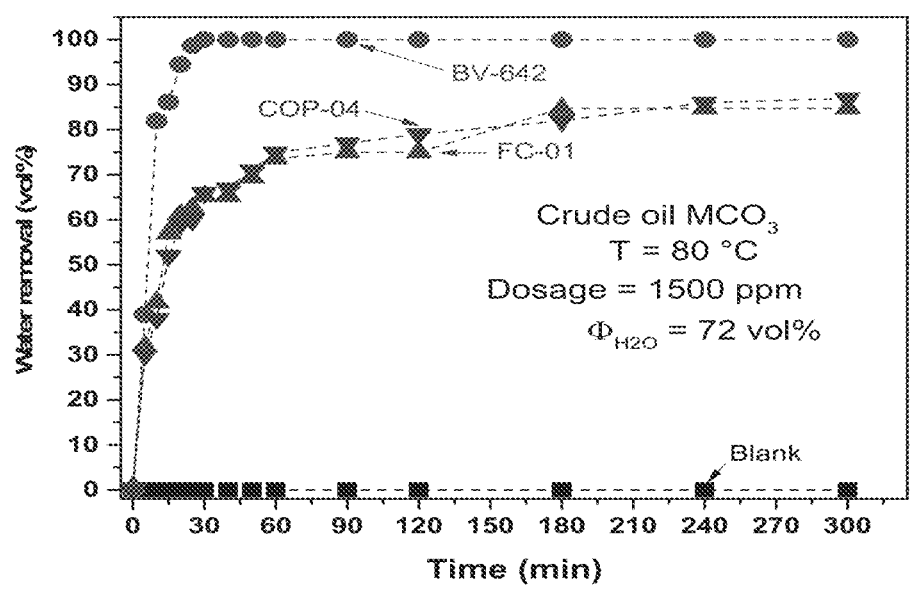
FIG. 15 shows the performances as dehydrating agents in the MCO$_3$ extra heavy crude oil ($\phi_{H2O}$=72 vol %; T=80° C.; 4.64° API) of the random BV-642 ethylene alkanoate-acrylic bipolymers of the present invention (AB/EE composition of 60/40 wt %, $\overline{M}_n$=3668 g·mol$^{-1}$), the COP-04 copolymer (AB/EE composition of 60/40 wt %, $\overline{M}_n$=2198 g·mol$^{-1}$), and the FC-01 commercial formulation at a dosage of 1500 ppm.
Figure 16:
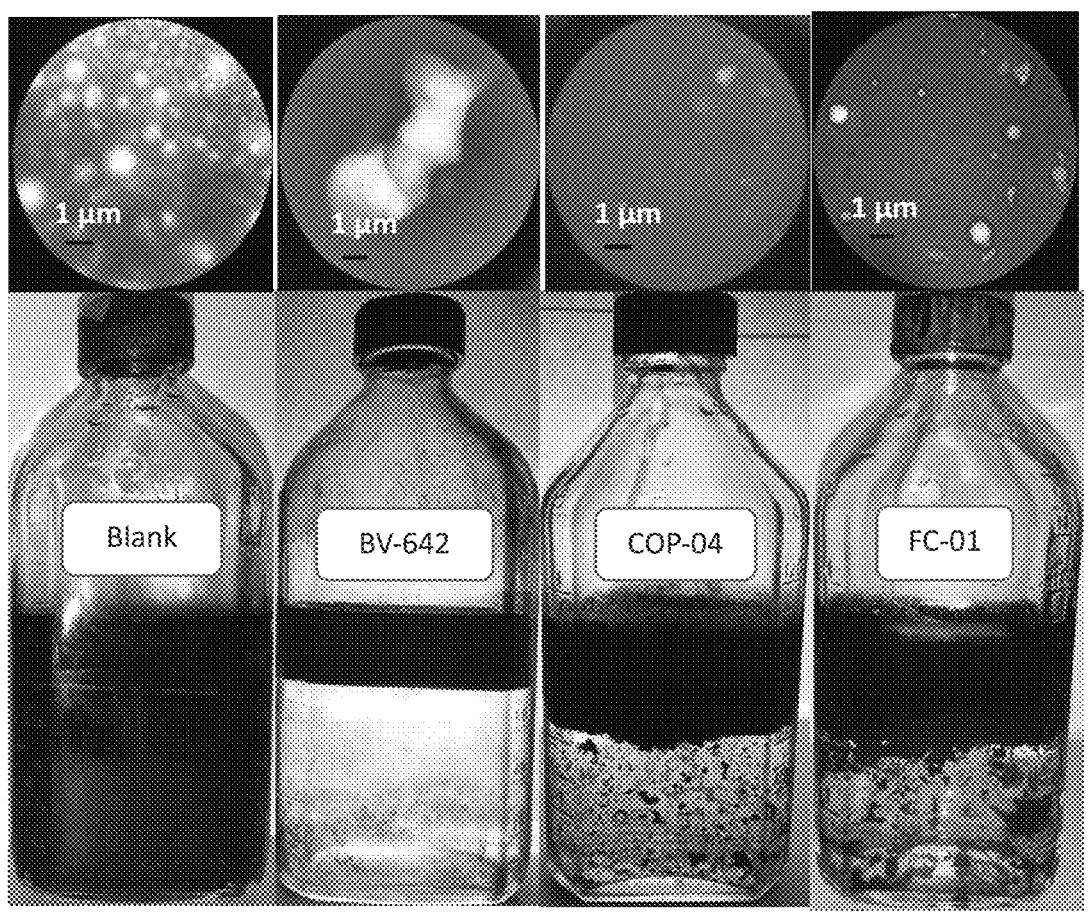
FIG. 16 shows the bottles images and micrographs of the MCO$_3$ extra heavy crude oil of 4.64° API once the evaluation has been completed. Only the BV-642 bipolymer (AB/EE composition of 60/40 wt %, $\overline{M}_n$=3668 g·mol$^{-1}$) removed 100 vol % of the emulsified water, and the FC-01 commercial formulation, that removed than that, at a dosage of 1500 ppm.

Example 8. Evaluation of the BV-642 random bipolymer, the COP-04 copolymer and the FC-01 commercial formulation as dehydrating agents in the MCO$_3$ crude oil with API gravity of 4.64°. FIG. 15 displays the performance of the highly random BV-642 ethylene alkanoate-acrylic bipolymer, and the COP-04 ethylene alkanoate-acrylic copolymer, compared with the FC-01 commercial formulation, based on polyethers, in the MCO$_3$ extra-heavy crude oil (4.64° API). It is notorious that the BV-642 bipolymer of high randomness exhibits the greatest coalescence rate and a water removal of 100 vol %. On the other hand, the COP-04 copolymer, with low monomer alternation in the chains, and the FC-01 commercial formulation, based on block bipolymers, present similar coalescence rates; however, the COP-04 bipolymer removed 87 vol %; whereas the FC-01 formulation removed 2 vol % less than the last one, despite having started the emulsion breakdown before the random bipolymers. Additionally, FIG. 16 shows that the MCO$_3$ crude oil dosed with the BV-642 bipolymer presents a homogeneous rupture, in contrast with the rupture observed when the COP-04 copolymer or FC-01 formulation are dosed to crude oils blends, which induce a slightly heterogeneous rupture. However, once these products are added to the MCO$_3$ crude oil, a good clarification of the aqueous phase is observed. Despite that, the dehydrating efficiency of the BV-642 bipolymer in the MCO$_3$ crude oil blend was noticeably superior to that of the COP-4 copolymer and FC-01 formulation, which was confirmed by the micrographic analysis, that revealed the complete absence of water and the presence of agglomerates of paraffins that reach a length of 8.3 μm when the crude oil was dosed with the BV-642 bipolymer. By contrast, the crude oil sample treated with the COP-04 copolymer revealed a great quantity of very tiny droplets, 0.1-0.3 μm, as well as paraffins agglomerates, which are probably found encircling the water droplets of greater size (0.6-0.9 μm). Finally, the crude oil sample with the FC-01 formulation presented water droplets of approximately 1 μm, characterized by having a halo of asphaltenes and a great quantity of agglomerated paraffins, which, are probably found between the asphaltenes halo and the water droplet.

Figure 17:
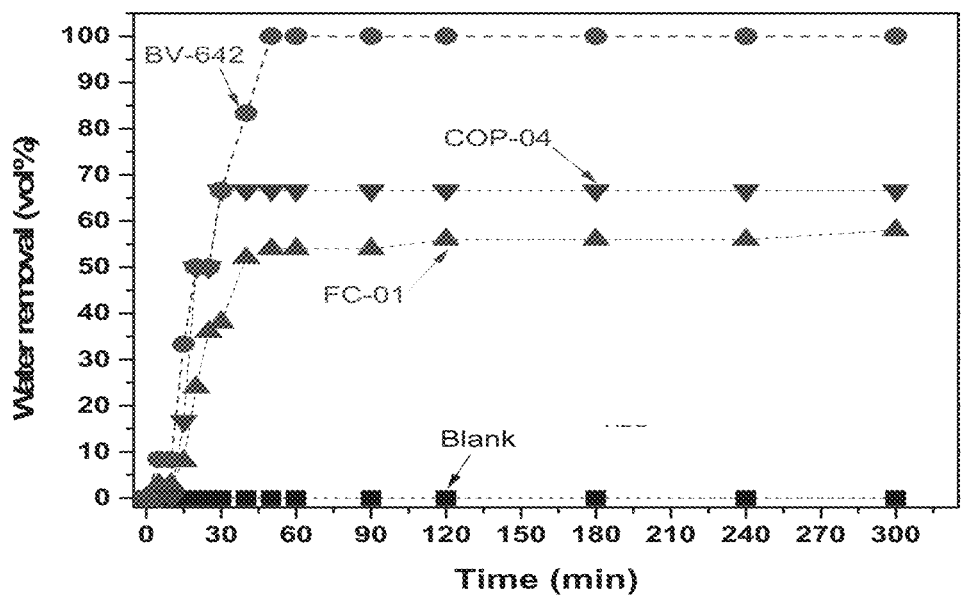
FIG. 17 show the performance as dehydrating agents in the MCO$_4$ heavy crude oil ($\phi_{H2O}$=6 vol %; T=56° C.; 21.09° API) of the random BV-642 bipolymer based on ethylene alkanoate-acrylic (AB/EE composition of 60/40 wt %, $\overline{M}_n$=2198 g·mol$^{-1}$) and the FC-01 commercial formulation at a dosage of 25 ppm.

Example 9. Evaluation of the BV-642 random bipolymer, the COP-04 copolymer and the FC-01 commercial formulation as dehydrating agents in the MCO$_4$ crude oil with API gravity of 21.09°. FIG. 17 displays the dehydrating activity of the BV-642 bipolymer, COP-04 ethylene alkanoate-acrylic copolymer and FC-01 commercial formulation, dosed at 25 ppm in the MCO$_4$ heavy crude oil (21.09° API). In this case, a similar coalescence rate is appreciated during the first 30 min of assessment where the COP-04 copolymer reaches its maximum water removal, 67 vol %; while the BV-642 bipolymer is able to withdraw 100 vol % of emulsified water at 50 min. Finally, the FC-01 formulation displayed the lowest coalescence rate and reached its maximum removal of 58 vol % at 300 min. The BV-642 bipolymer has an excellent demulsifying behavior even at a quite low concentration.

Figure 18:
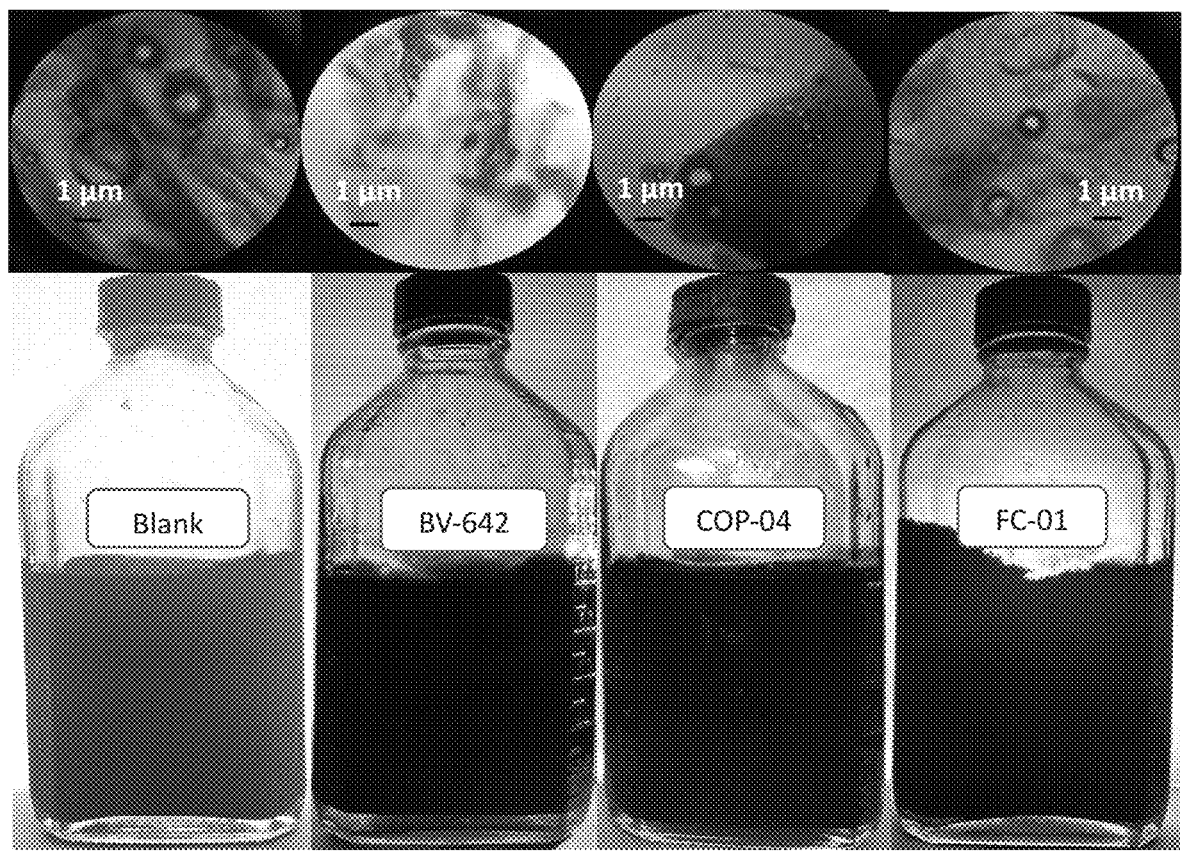
FIG. 18 shows the bottles images and micrographs of the MCO$_4$ heavy crude oil of 21.09° API after the assessment with the BV-642 bipolymer (AB/EE composition of 60/40 wt %, $\overline{M}_n$=3668 g·mol$^{-1}$), compared with the COP-04 ethylene ethanoate-acrylic copolymer (AB/EE composition of 60/40 wt %, $\overline{M}_n$=2198 g·mol$^{-1}$), and the FC-01 commercial formulation at a dosage of 25 ppm.

FIG. 18 exhibits the homogeneous rupture obtained for the three demulsifying products in the $MCO_4$ crude oil blend, resulting in a comparable clarification, highlighting as an advantage the best demulsifying efficiency of the new BV-642 random bipolymer. On the other hand, on the blank micrograph is appreciated a droplets system that is polydispersed in diameter, where the water droplets are surrounded by a thick layer of asphaltenes; while the images of the organic phase, after the application of BV-642, show absence of water droplets and a great quantity of asphaltenes agglomerates that are dispersed in crude oil. Otherwise, the COP-04 copolymer was not capable of removing the asphaltenes that surround the water droplets; likewise, the FC-01 formulation generated a residual emulsion with a droplet size between 0.5 and 0.8 μm, which keep the thick layer of asphaltenes in their interface. It is clear that a demulsifier of high efficiency achieves the displacement of the asphaltenes barrier in the water/crude oil interface, allowing the coalescence of the water droplets. This is the case of the novel random alkyl acrylic-ethylene alkanoate bipolymers, which are able to completely eliminate the emulsified water in heavy crude oils.

The invention claimed is:

1. A composition of high randomness bipolymer for destabilizing complex emulsions in crude oils blends, comprising a composition of ethylene alkanoate-alkyl acrylate bipolymer dissolved at a concentration of from 10 to 50 wt % in a carrier solvent selected from the group consisting of xylene, benzene, toluene, methyl-ethyl-ketone, kerosene, jet fuel, naphtha, and mixtures thereof, and having a boiling point between 35 and 200° C.

* * * * *